United States Patent
Akimoto et al.

(10) Patent No.: US 12,315,107 B2
(45) Date of Patent: May 27, 2025

(54) IMAGING SYSTEM, DRIVING ASSISTANCE SYSTEM, AND PROGRAM

(71) Applicant: SEMICONDUCTOR ENERGY LABORATORY CO., LTD., Atsugi (JP)

(72) Inventors: Kengo Akimoto, Kanagawa (JP); Koki Inoue, Kanagawa (JP); Yusuke Koumura, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 332 days.

(21) Appl. No.: 17/792,053

(22) PCT Filed: Jan. 6, 2021

(86) PCT No.: PCT/IB2021/050054
§ 371 (c)(1),
(2) Date: Jul. 11, 2022

(87) PCT Pub. No.: WO2021/144662
PCT Pub. Date: Jul. 22, 2021

(65) Prior Publication Data
US 2023/0044180 A1    Feb. 9, 2023

(30) Foreign Application Priority Data
Jan. 17, 2020    (JP) .................. 2020-005594

(51) Int. Cl.
*G06T 3/4053*    (2024.01)
*G06T 3/4046*    (2024.01)
(Continued)

(52) U.S. Cl.
CPC .......... *G06T 3/4053* (2013.01); *G06T 3/4046* (2013.01); *G06T 7/11* (2017.01);
(Continued)

(58) Field of Classification Search
None
See application file for complete search history.

(56) References Cited

U.S. PATENT DOCUMENTS 8,497,479 B1 * 7/2013 Garman ................. H04N 23/75
                                                             396/505
8,780,034 B2    7/2014 Kimura
(Continued)

FOREIGN PATENT DOCUMENTS

| CN | 103609101 A | 2/2014 |
| EP | 2723069 A | 4/2014 |

(Continued)

OTHER PUBLICATIONS

International Search Report (Application No. PCT/IB2021/050054) Dated Apr. 20, 2021.
(Continued)

*Primary Examiner* — Anand P Bhatnagar
(74) *Attorney, Agent, or Firm* — Fish & Richardson P.C.

(57) ABSTRACT

The driving assistance system includes an imaging device capable of capturing a first monochrome image in a vehicle traveling direction, a first neural network for segmentation processing, a second neural network for depth estimation processing, a determination portion determining a center of a portion cut off from the first monochrome image on the basis of the segmentation processing and the depth estimation processing, a third neural network for colorization processing of only a second cut-off monochrome image, and a display device for enlargement of the second monochrome image subjected to the colorization processing.

6 Claims, 17 Drawing Sheets

(51) Int. Cl.
  *G06T 7/11* (2017.01)
  *G06T 7/50* (2017.01)
  *G06V 10/25* (2022.01)
  *G06V 10/82* (2022.01)
  *H04N 9/43* (2006.01)

(52) U.S. Cl.
  CPC ............... *G06T 7/50* (2017.01); *G06V 10/25* (2022.01); *G06V 10/82* (2022.01); *H04N 9/43* (2013.01); *G06T 2207/10024* (2013.01); *G06T 2207/30252* (2013.01)

(56) References Cited

U.S. PATENT DOCUMENTS

| | | | |
|---|---|---|---|
| 8,988,411 B2 | 3/2015 | Miyake | |
| 9,013,579 B2 | 4/2015 | Ikeda et al. | |
| 9,424,462 B2* | 8/2016 | Otsuka | G08G 1/166 |
| 9,870,617 B2* | 1/2018 | Piekniewski | G06T 7/285 |
| 10,013,610 B2* | 7/2018 | Chen | G06V 10/25 |
| 10,657,409 B2* | 5/2020 | Piekniewski | G01B 11/14 |
| 10,672,609 B2 | 6/2020 | Iwaki et al. | |
| 10,810,456 B2* | 10/2020 | Piekniewski | G06T 7/285 |
| 10,860,885 B2* | 12/2020 | Dahiya | G06V 10/50 |
| 11,636,333 B2* | 4/2023 | Sidhu | G05B 13/027 |
| | | | 706/25 |
| 11,893,774 B2* | 2/2024 | Cooper | G06V 20/00 |
| 12,020,476 B2* | 6/2024 | Iandola | B60R 11/04 |
| 2010/0246896 A1* | 9/2010 | Saito | G06V 20/584 |
| | | | 382/173 |
| 2014/0118551 A1 | 5/2014 | Ikeda et al. | |
| 2017/0116477 A1* | 4/2017 | Chen | G01C 21/3819 |
| 2019/0043208 A1* | 2/2019 | Piekniewski | G01B 11/14 |
| 2019/0251386 A1* | 8/2019 | Piekniewski | G06T 7/20 |
| 2021/0034925 A1 | 2/2021 | Ogata | |
| 2021/0193059 A1 | 6/2021 | Kimura | |

FOREIGN PATENT DOCUMENTS

| | | | | |
|---|---|---|---|---|
| EP | 2723069 A1 * | 4/2014 | | B60R 1/00 |
| JP | 2007-159036 A | 6/2007 | | |
| JP | 2007159036 | * 6/2007 | | H04N 7/18 |
| JP | 2011-119711 A | 6/2011 | | |
| JP | 2013-005232 A | 1/2013 | | |
| JP | 2016-123087 A | 7/2016 | | |
| JP | 2019-164626 A | 9/2019 | | |
| JP | 2018/197984 | 3/2020 | | |
| WO | WO-2012/172923 | 12/2012 | | |
| WO | WO-2019/181429 | 9/2019 | | |

OTHER PUBLICATIONS

Written Opinion (Application No. PCT/IB2021/050054) Dated Apr. 20, 2021.

* cited by examiner

FIG. 9A

| -1 | -1 | -1 |
|----|----|----|
| -1 | 8  | -1 |
| -1 | -1 | -1 |

FIG. 9B

| -1 | -1 | -1 |
|----|----|----|
| 0  | 0  | 0  |
| 1  | 1  | 1  |

FIG. 9C

| -1 | -2 | -1 |
|----|----|----|
| 0  | 0  | 0  |
| 1  | 2  | 1  |

FIG. 15A1
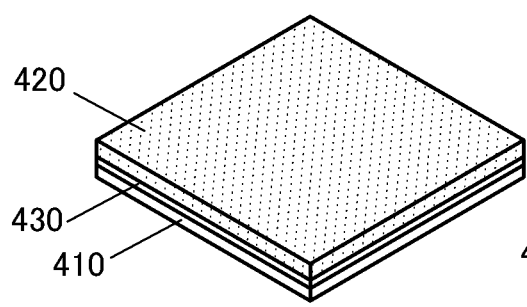
FIG. 15B1
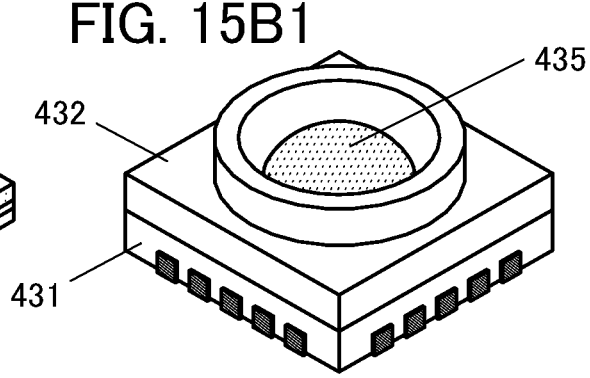
FIG. 15A2
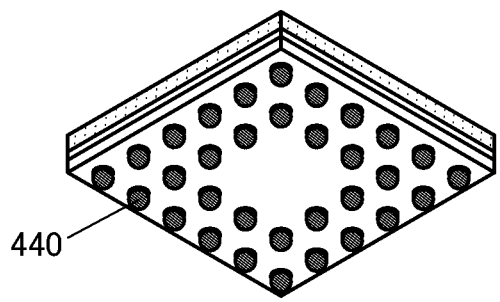
FIG. 15B2
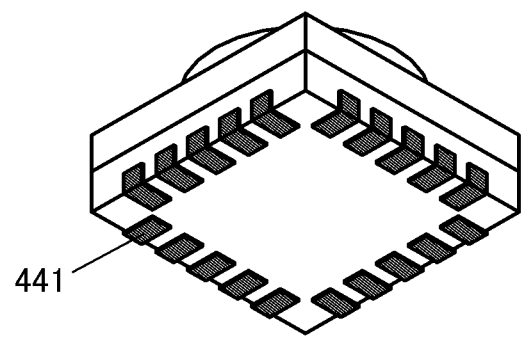
FIG. 15A3
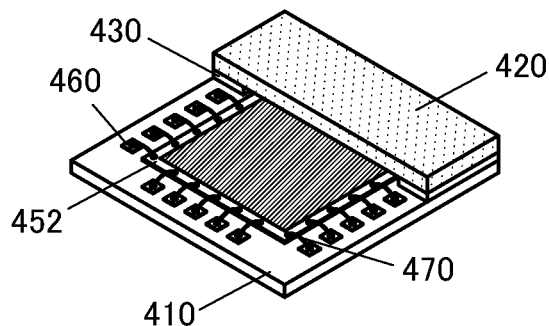
FIG. 15B3
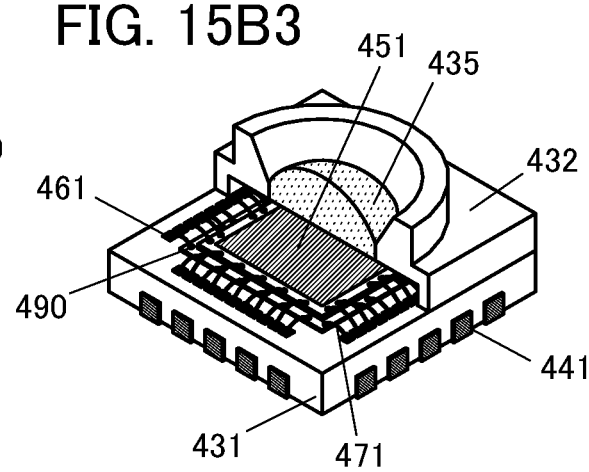

IMAGING SYSTEM, DRIVING ASSISTANCE SYSTEM, AND PROGRAM

CROSS REFERENCE TO RELATED APPLICATIONS

This application is a U.S. National Phase Application under 35 U.S.C. § 371 of International Application PCT/IB2021/050054, filed on Jan. 6, 2021, which is incorporated by reference and claims the benefit of a foreign priority application filed in Japan on Jan. 17, 2020, as Application No. 2020-005594.

TECHNICAL FIELD

One embodiment of the present invention relates to a neural network and an imaging system using the neural network. Another embodiment of the present invention relates to an electronic device using a neural network. Another embodiment of the present invention relates to a vehicle using a neural network. Another embodiment of the present invention relates to an imaging system that obtains a color image by using an image processing technique from a monochrome image obtained in a solid-state imaging element. Another embodiment of the present invention relates to a video monitoring system or a security system using the imaging system, a safety information service system, or a driving assistance system.

Note that one embodiment of the present invention is not limited to the above technical field. One embodiment of the invention disclosed in this specification and the like relates to an object, a method, or a manufacturing method. One embodiment of the present invention relates to a process, a machine, manufacture, or a composition of matter. Therefore, specific examples of the technical field of one embodiment of the present invention disclosed in this specification and the like include a semiconductor device, a display device, a light-emitting device, a power storage device, a storage device, an electronic device, a lighting device, an input device, an input/output device, a driving method thereof, and a manufacturing method thereof. One embodiment of the present invention relates to a vehicle or an electronic device for vehicles provided in a vehicle.

Note that in this specification and the like, a semiconductor device refers to any device that can function by utilizing semiconductor characteristics. A transistor and a semiconductor circuit are embodiments of semiconductor devices. In addition, in some cases, a storage device, a display device, an imaging device, or an electronic device includes a semiconductor device.

Another embodiment of the present invention relates to a program using a neural network.

Another embodiment of the present invention relates to a driving system in which a vehicle such as a motor vehicle can freely switch between a safety-assisted driving state, a semi-autonomous driving state, and an autonomous driving state.

BACKGROUND ART

A technique for forming a transistor by using an oxide semiconductor thin film formed over a substrate has attracted attention. For example, an imaging device with a structure in which a transistor that includes an oxide semiconductor and has an extremely low off-state current is used in a pixel circuit is disclosed in Patent Document 1.

In addition, a technique for adding an arithmetic function to an imaging device is disclosed in Patent Document 2.

REFERENCE

Patent Documents

[Patent Document 1] Japanese Published Patent Application No. 2011-119711
[Patent Document 2] Japanese Published Patent Application No. 2016-123087

SUMMARY OF THE INVENTION

Problems to be Solved by the Invention

With technological development, a high-quality image can be easily captured by an imaging device provided with a solid-state imaging element such as a CMOS image sensor. In the next generation, an imaging device is required to be equipped with more intelligent functions.

An object of one embodiment of the present invention is to provide an imaging device capable of image processing. Another object is to provide an imaging device capable of high-speed operation. Another object is to provide an imaging device with low power consumption. Another object is to provide a highly reliable imaging device. Another object is to provide a novel imaging device or the like. Another object is to provide a method for driving the imaging device. Another object is to provide a novel semiconductor device or the like.

Another object of one embodiment of the present invention is to provide a driving assistance system suitable for a semi-autonomous driving vehicle and an electronic device for vehicles.

Note that the description of these objects does not preclude the existence of other objects. Note that one embodiment of the present invention does not have to achieve all these objects. Note that other objects will be apparent from the descriptions of the specification, the drawings, the claims, and the like, and other objects can be derived from the descriptions of the specification, the drawings, the claims, and the like.

Means for Solving the Problems

A technique for capturing a monochrome image and performing colorization is particularly suitable for imaging at night. For example, the color of an image captured at night is different from that of an image captured during the daytime because the amount of light at night is smaller than that of the daytime. In addition, in the case where imaging is performed using infrared rays in a dark environment that needs imaging using infrared rays, a monochrome image is obtained. Furthermore, in imaging using infrared rays, brightness greatly differs between a material that reflects infrared rays and a material that absorbs infrared rays. Even when these materials are placed in the same position, there is a depth problem that the material that reflects infrared rays is seen in the foreground and the material that absorbs infrared rays is seen in the background.

In addition, when driving in a dark environment is assumed, in the case where the light of an oncoming car is illuminated, the visibility of surroundings becomes poor. In particular, the pupils of human eyes become small, so that the human eyes cannot perceive the surroundings. Accordingly, when image display by an imaging device that can freely set exposure is used accessorily, the ease of securing the safety of the surroundings is increased. It is desirable that this image have high visibility.

It is desirable that such an image be subjected to segmentation processing and an image of a human or a car be subjected to highlighting in addition to colorization. However, in the case of a distant image, the image is small and accuracy is decreased because the amount of information is small. In particular, in the case where the imaging device is incorporated in a vehicle, an image is sometimes blurred due to vibration or the like. In the case where the imaging device is used as an in-vehicle camera, in particular, when vehicle speed is increased, distant information is needed.

As the vehicle speed is increased, a driver's viewing angle is narrowed; however, there is a contradiction in which a wide viewing angle is needed to perform safe driving. In addition, it is not practical to decrease the vehicle speed in order to secure a wide viewing angle. It is desirable to have an environment where safe driving can be performed regardless of whether the vehicle speed is low or high.

As the vehicle speed is increased, the driver's viewing angle is narrowed; however, safety during the vehicle driving is increased by automatically capturing an image of a region to be careful with a camera and displaying the image for the driver to assist the driver.

On the other hand, it is possible to take an enlarged image by adjustment of a camera lens; however, it is difficult for the driver to perform adjustment such as enlargement or reduction of an optical system, and it is also difficult to provide a mechanism where the driver changes a lens direction to move a lens focus and changes an imaging direction. In addition, even when an image of a distant portion is captured by a telephoto lens, an object is sometimes lost due to vibration or the like during driving. It is desirable that only an important portion be automatically extracted and displayed without changing the focal length or direction of the camera, independently of the driver. The important portion refers to, for example, a vehicle that moves on a distant road or a region where a pedestrian or the like is present.

A driving assistance system is desirable in which a specific region to be careful is displayed and a burden on a driver is reduced during vehicle driving. In addition, in the case where the region to be careful is distant, a display system for enlarging the region is also desirable.

A structure of an invention disclosed in this specification is a driving assistance system that includes an imaging device capable of capturing a first monochrome image in a vehicle traveling direction, a first neural network for segmentation processing, a second neural network for depth estimation processing, a determination portion determining a center of a portion cut off from the first monochrome image on the basis of the segmentation processing and the depth estimation processing, a third neural network for colorization processing of only a second cut-off monochrome image, and a display device for enlargement of the second monochrome image subjected to the colorization processing.

In the above structure, the driving assistance system is incorporated in a vehicle and thus preferably uses a plurality of learned neural networks and includes one or a plurality of storage portions in which a program for performing the plurality of learned neural networks. One or more processors are incorporated in a vehicle to perform these neural networks.

In addition, a driving assistance system includes a step of driving a vehicle incorporating an imaging device, a step of capturing a monochrome image of a front of the vehicle during driving by the imaging device, a step of performing inference of a region of at least a sky, a car, and a road by performing segmentation processing on a monochrome image including the distant region, a step of performing inference of a specific distant region by performing depth estimation processing on the monochrome image including the distant region, a step of determining a center of a portion cut off from the monochrome image on the basis of the segmentation processing and the depth estimation processing, a step of extracting a rectangular region in which a center is a central portion, inputting extracted data, and performing super-resolution processing, a step of inputting an output result of the super-resolution processing and performing colorization processing for highlighting of an object included in the distant region with high accuracy, and a step of performing enlargement of the distant region subjected to colorization processing. Note that the specific distant region refers to a region including at least a road edge portion in a traveling direction.

Furthermore, the driving assistance system may further includes a step of measuring driving speed of the vehicle in addition to the steps. The size of an image to be cut off can be changed depending on the driving speed of the vehicle. For example, the size of the rectangular region in which the center of the portion cut off from the monochrome image is the central portion can be determined by the driving speed of the vehicle. A cut-off area is large in the case of high vehicle speed compared to the case of low vehicle speed. Accordingly, it is possible to make up for the field of view of a driver that is narrowed by the speed.

One or more processors perform processing for reading and executing a program including any one or all of the steps. A program in which a computer executes each step is stored in a storage portion in advance. In addition, there is no limitation to the processor, and a circuit that achieves a function for performing any one or all of the steps (for example, an FPGA circuit or an ASIC circuit) can also perform the processing for reading and executing the program.

In the above structure, the segmentation processing uses first neural network processing; the depth estimation processing uses second neural network processing; the super-resolution processing uses third neural network processing; and the colorization processing uses fourth neural network processing. As a training data set for learning of the segmentation processing, MSCOCO, Cityscapes, or the like is used. In addition, as a training data set for learning of the depth estimation processing, KITTI or the like is used. As a training data set for learning of the super-resolution processing, there is no particular limitation, and not only a photograph but also an illustration may be used. As a training data set for learning of the colorization processing, there is no particular limitation as long as the training data set is a color training data set, and ImageNet or a color image captured by a dashboard camera can be processed and used.

When the driving assistance system is specifically described, neural network processing is performed under a state in which color information is reduced and the amount of captured information is reduced, the distant region is cut off so that the amount of data is further reduced, only the distant region is subjected to colorization, and enlargement is performed. The amount of data can be reduced by reduction of the color information, and arithmetic processing in the neural network processing can be made simple. In addition, when the amount of data can be reduced, the size of hardware capable of performing the neural network processing can be made small. An imaging device that does not include a color filter has a wider dynamic range because not only color information reduction but also no light reduction due to a color filter and ease of securing the amount of light reaching a light-receiving sensor can be achieved.

In addition, a device or a vehicle including the imaging system and the driving assistance system disclosed in this specification can also be referred to as an image generation device. The image generation device selectively performs colorization processing on part of a monochrome image with a wide dynamic range that is captured by an imaging device without a color filter and performs enlargement.

Furthermore, an image colored by the colorization processing does not have a natural color in many cases, and the image is highlighting, which is easily recognized by the driver.

Moreover, there is no limitation to an imaging device without using a color filter. In addition to the imaging device without using a color filter, a driving assistance system may be constructed by a combination with an imaging device including a color filter, or a combination with another environment recognition unit, for example, a stereo camera, a sonar, a multifocal multi-eye camera system, a LIDAR, a millimeter-wave radar, an infrared sensor (a TOF system), or the like. In distance measurement with the TOF system, a light source and a light detector (a sensor or a camera) are used. A camera used in the TOF system is referred to as a time-of-flight camera, and is also referred to as a TOF camera. The TOF camera can obtain distance information between a light source emitting light and an object on the basis of time of flight of reflected light of light delivered on the object.

Effect of the Invention

With the use of a plurality of neural networks, a region to be careful that is enlarged can be provided to a driver. Image display that mainly assists the driver can be provided.

In addition, clear color display of a distant region in a vehicle traveling direction can be provided to the driver in an environment with an insufficient amount of light, for nightfall hours, for night hours, for early-morning hours, or when passing through a long tunnel, for example; thus, there is an especially remarkable effect.

BRIEF DESCRIPTION OF THE DRAWINGS

FIG. 9A to FIG. 9C are diagrams each illustrating a filter.

FIG. 15A1 to FIG. 15A3 are perspective views of a package in which an imaging device is placed, and FIG. 15B1 to FIG. 15B3 are perspective views of a module.

MODE FOR CARRYING OUT THE INVENTION

Embodiments of the present invention will be described in detail below with reference to the drawings. Note that the present invention is not limited to the following description, and it is readily understood by those skilled in the art that modes and details of the present invention can be modified in various ways. In addition, the present invention should not be construed as being limited to the description of the following embodiments.

Embodiment 1

Figure 1:
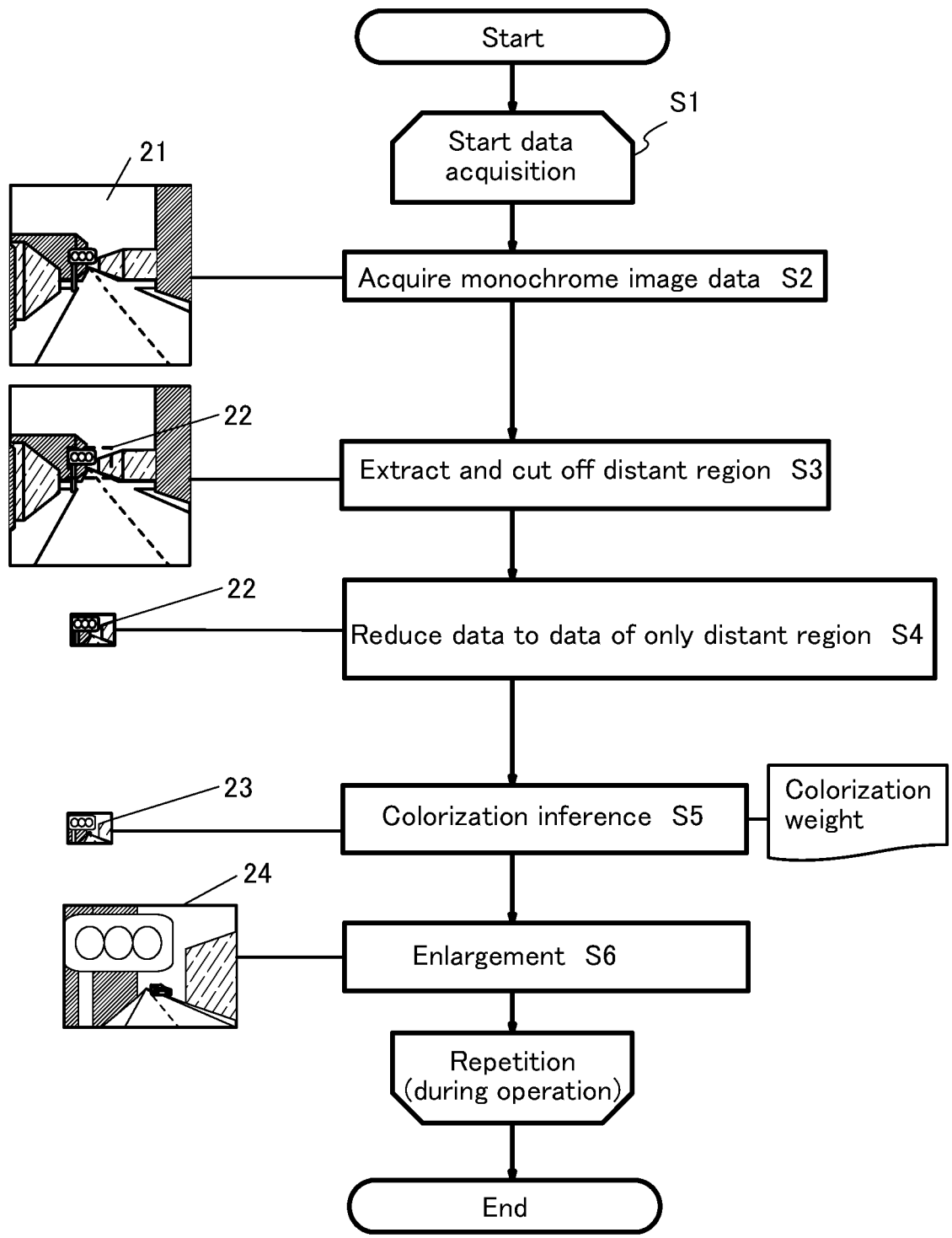
FIG. 1 is a diagram illustrating an example of a flow chart showing one embodiment of the present invention.

In this embodiment, FIG. 1 illustrates an example of a flow of a driving assistance system that selectively extracts a distant region to which a driver should pay attention from a monochrome video obtained by an in-vehicle solid-state imaging element, performs colorization on part of the extracted distant region, and provides an enlarged video to the driver.

An imaging system that has a hardware structure including a solid-state imaging element is placed in part of a vehicle (a hood, the inside of the vehicle, a roof, or the like) capable of shooting in a vehicle traveling direction (including a distant region), and is activated to start continuous shooting.

In-vehicle hardware has a structure in which one or more processors mainly control operation in each step. In the case where neural network processing is performed, hardware including a storage portion such as a memory adequate for accumulating learning data and capable of adequate arithmetic processing is needed. The storage portion refers to a compact large-capacity storage device (for example, an SSD or a hard disk) capable of being incorporated in a vehicle. When a program stored in a compact large-capacity storage device is executed, processing in the flow chart illustrated in FIG. 1 can be achieved.

First, data acquisition starts (S1).

Monochrome image data is acquired using a solid-state imaging element without a color filter (S2). Note that a plurality of solid-state imaging elements arranged in a matrix direction is sometimes referred to as a pixel array. In addition, a display example 21 of a video captured immediately after Step S2 is illustrated on a left side in FIG. 1. Note that the display example 21 is illustrated for easy understanding and is not actually displayed. The display example 21 is actually monochrome image data that is converted into a signal format (JPEG (registered trademark) or the like).

Next, a distant region that is part of captured image data is extracted and cut off (S3). A distant region in a vehicle traveling direction is a region that is most hardly recognized by the driver when driving in a dark state, for example, in the evening, at night, or in the early morning. A solid-state imaging element without a color filter can capture a video with a wider dynamic range than a solid-state imaging element with a color filter; thus, an object in the distant region can be captured as a video.

In this embodiment, the distant region in the vehicle traveling direction is selectively extracted. As an extraction method, a portion is identified using depth estimation or data obtained by a depth sensor module (a TOF camera or the like) that measures depth. In the case where depth estimation is used, neural network processing is performed. In Step S3, as an example in which the distant region is extracted, a region surrounded by dotted lines in FIG. 1 is illustrated as a distant region 22 to be extracted. When the distant region is cut off in Step S3, the amount of data to be used can be reduced.

In addition, in Step S3, size to be cut off may be determined using data of a speed meter. The speed meter is a device that enables supplement of signals from a GPS and a GLONASS satellite. With the use of a GPS or the like, the speed, position, or mileage of the vehicle during driving can be measured.

Then, data is reduced to data of only the distant region 22 (S4). In Step S4, data other than the data cut off in S3 is deleted. Note that the original data may be stored in a dedicated storage device.

After that, colorization inference is performed on the data of only the distant region 22 (S5). In this embodiment, the data reduced in Step S4 is used as input data, convolutional processing is performed using a CPU or the like, and inference of an edge, a color, and the like is performed for colorization.

In addition, in the case where monochrome image colorization is executed by software, a program or the like may be installed from a network, a storage medium, or a computer in which a program that constructs software is incorporated in hardware. A program stored in a computer-readable storage medium such as a CD-ROM (Compact Disk Read Only Memory) is installed, and the program for monochrome image colorization is executed. Processing by the program is not necessarily performed in order or on the time series, and may be performed in parallel, for example.

Furthermore, a program of software executing an inference program for neural network processing used for depth estimation or colorization inference can be described in a variety of programing languages such as Python, Go, Perl, Ruby, Prolog, Visual Basic, C, C++, Swift, Java (registered trademark), and NET. Moreover, an application may be made using a framework such as Chainer (it can be used with Python), Caffe (it can be used with Python and C++), and TensorFlow (it can be used with C, C++, and Python). For example, the algorithm of LSTM is programmed with Python, and a CPU (Central Processing Unit) or a GPU (Graphics Processing Unit) is used. A chip in which a CPU and a GPU are integrated is sometimes referred to as an APU (Accelerated Processing Unit), and this APU chip can also be used. Alternatively, an IC incorporating an AI system (also referred to as an inference chip) may be used. The IC incorporating an AI system is sometimes referred to as a circuit performing neural network calculation (a microprocessor).

In this embodiment, inference is performed inside the vehicle; thus, a feature value learned in advance (a colorization weight) is used. By storing the learned feature value in the storage device and performing arithmetic operation, it is possible to output data at a level similar to that when not using the learned feature value. Since data reduced in advance is used, a load on arithmetic processing is reduced. Note that FIG. 1 illustrates a colorization image 23 as a display example after colorization.

The thus obtained colorization image 23 uses an imaging element without a color filter and is based on a monochrome image with wide dynamic range; thus, even in the case where a conventional imaging element with a color filter cannot perform identification because of a small amount of light, identifiable colorization image data can be obtained.

Finally, the colorization image 23 is enlarged on a display portion of a display device as a highlighted image 24 (S6). The highlighted image can be obtained by enlargement. However, colorization is further performed using colorization inference in this embodiment, and an image that is different from an actual video is obtained though the image has a color close to a natural color. Accordingly, the highlighted image can be made. Note that either Step S6 or Step S5 may be performed first because the result is the same even when the sequence of Step S6 and Step S5 is reversed.

Acquisition of the highlighted image is repeated. Repeated acquisition also enables real-time display of the distant region as the highlighted image.

The driving assistance system can clearly achieve imaging in a comparatively dark place and can provide the driver with a region to which the driver needs to pay attention as a highlighted image. The driving assistance system can particularly prevent accidents in a dark place with little lighting, such as in the evening or at night.

In addition, when a camera for imaging of vehicle surroundings or a radar is combined with an ECU (Electronic Control Unit) for image processing or the like, the driving assistance system can also be applied to a vehicle capable of semi-autonomous driving or a vehicle capable of fully autonomous driving. A vehicle using an electric motor includes a plurality of ECUs, and engine control and the like are performed by the ECUs. The ECU includes a microcomputer. The ECU is connected to a CAN (Controller Area Network) provided in the electric vehicle. The CAN is a type of a serial communication standard used as an in-vehicle LAN. For the ECU, a CPU or a GPU is used. For example, a structure can be employed in which a solid-state imaging element without a color filter is used as one of a plurality of cameras (dashboard cameras, rear cameras, and the like) incorporated in an electric vehicle so that part of an obtained monochrome image can be extracted, inference can be performed in the ECU through the CAN, a colorization image can be created, and a highlighted image can be displayed on a display portion of an in-vehicle display device by enlargement.

Furthermore, in this embodiment, in the case where a portion to be extracted is identified using data obtained by a depth sensor module (a TOF camera or the like) that measures depth as a method for selectively extracting a distant region, colorization inference is performed by performing neural network processing once. In that case, since neural network processing is performed only once, arithmetic processing can be small-scale arithmetic processing, which has an advantage of a small load on a CPU.

Alternatively, in the case where depth estimation is used as a method for selectively extracting a distant region, first neural network processing is performed for depth estimation, and second neural network processing is performed for colorization inference. In that case, it is possible to eliminate the need for providing a depth sensor module that measures depth. In addition, although neural network processing is performed twice, a load on arithmetic operation is reduced by reduction of input data of neural network processing for colorization.

Embodiment 2

In this embodiment, an example in which a method for extracting a distant region is different from that in Embodiment 1 will be described. Many other portions are the same as those in Embodiment 1; thus, detailed description thereof will be omitted here.

Figure 2:
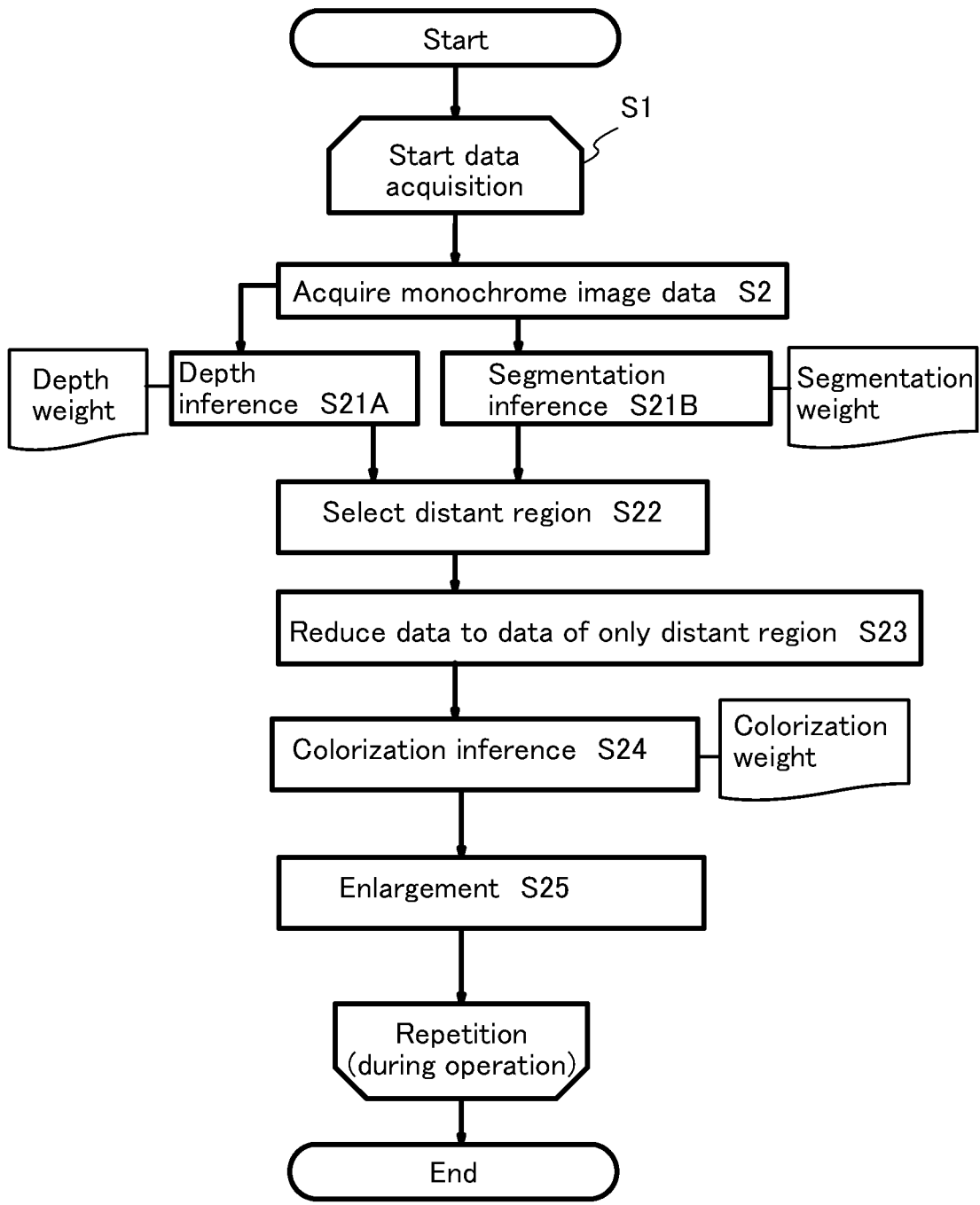
FIG. 2 is a diagram illustrating an example of a flow chart showing one embodiment of the present invention.

FIG. 2 illustrates an example of a flow of a driving assistance system. Note that the same reference numerals are used for steps that are the same as those in the flow chart shown in FIG. 1 in Embodiment 1.

First, data acquisition starts (S1).

Monochrome image data is acquired using a solid-state imaging element without a color filter (S2).

Then, in order to select a distant region that is part of captured image data, depth estimation is performed using monochrome image data (S21A). In addition, segmentation inference is also performed using the monochrome image data (21B).

Embodiment 1 also illustrates an example of depth estimation. In this embodiment, inference is performed inside a vehicle; thus, a feature value learned in advance (a depth weight) is used.

Segmentation inference is also referred to as segmentation. Note that segmentation refers to processing for identifying what object each pixel of an input image represents. This is also referred to as semantic segmentation. Software for generating a plurality of image segments for use in image analysis is executed by neural network processing. Specifically, segmentation is performed on the basis of learned content by using U-net, FCRN (Fully Convolutional Residual Networks), or the like that is a type of image processing and a convolutional neural network (CNN). Note that the label of segmentation is differentiated by a vehicle, a sky, a plant, a ground, a human, a building, or the like. In addition, in this embodiment, inference is performed inside the vehicle; thus, a feature value learned in advance (a segmentation weight) is used.

Step S21A and Step S21B may be sequentially performed or may be performed in parallel.

Next, regions of a sky and a road obtained by segmentation inference are focused on, and the coordinates of an upper end portion of the road where a distance between the sky and the road (a space between a lower end portion of the sky and an upper end portion of the road) is the shortest is extracted in a segmentation image. This is because the circumference of a driving lane end portion corresponds to a portion where the space between the sky and the road in the image is the shortest, as shown in the display example 21 in FIG. 1.

The number of portions where the coordinates on the road in which the distance between the sky and the road is the shortest is not limited to one in the segmentation image, and the number of such portions is sometimes more than one.

In the case where the number of portions where the coordinates on the road in which the distance between the sky and the road is the shortest is more than one in the segmentation image, the most distant coordinates are selected among them (S22).

From a region of the ground obtained in Step S21B, a portion with the maximum depth in the region is extracted from the results in Step 21A. By identifying a driving lane end portion in a monochrome image, a central portion of the distant region to be cut off later can be determined.

Then, data is reduced to data of only the distant region (S23).

After that, colorization inference is performed on the data of only the distant region (S24). In this embodiment, inference is performed inside the vehicle; thus, a feature value learned in advance (a colorization weight) is used.

Finally, the colorization image is enlarged on a display portion of a display device as a highlighted image (S25).

Acquisition of the highlighted image is repeated.

In this embodiment, as a method for selectively extracting a distant region, first neural network processing is performed for depth estimation, second neural network processing is performed for segmentation inference, and third neural network processing is performed for colorization inference. A feature value learned in advance is used in each of these inferences; thus, arithmetic operation is performed inside the vehicle.

This embodiment can be freely combined with Embodiment 1.

Embodiment 3

In this embodiment, an example in which a method for extracting a distant region is different from that in Embodiment 2 will be described. Many other portions are the same as those in Embodiment 1 or Embodiment 2; thus, detailed description thereof will be omitted here.

Figure 3:
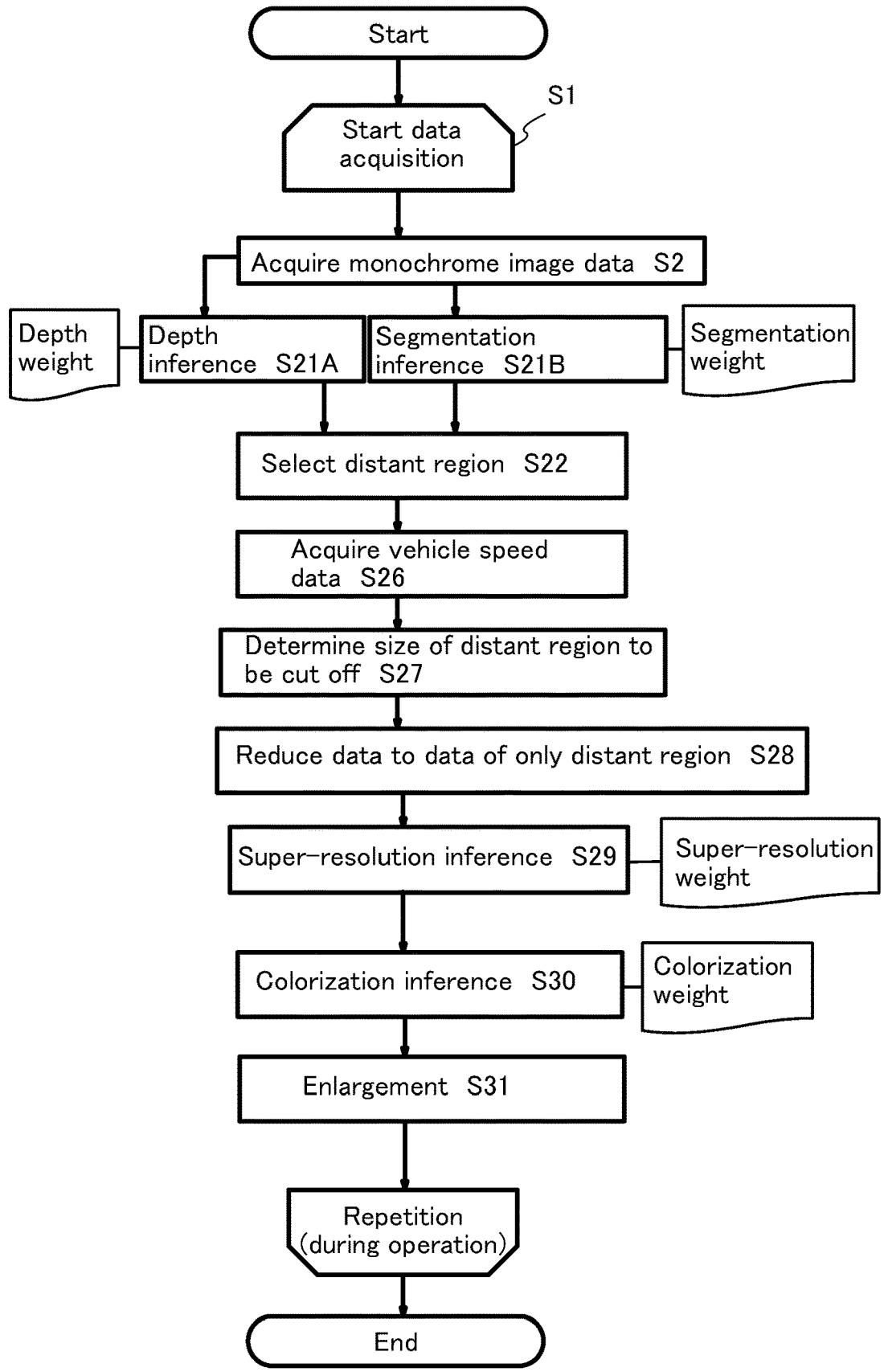
FIG. 3 is a diagram illustrating an example of a flow chart showing one embodiment of the present invention.

FIG. 3 illustrates an example of a flow of a driving assistance system. Note that the same reference numerals are used for steps that are the same as those in the flow chart shown in FIG. 1 in Embodiment 1 and FIG. 2 in Embodiment 2.

Monochrome image data is acquired using a solid-state imaging element without a color filter (S2).

Then, in order to select a distant region that is part of captured image data, depth estimation is performed using monochrome image data (S21A). In addition, segmentation inference is also performed using the monochrome image data (21B).

Next, the distant region is selected (S22).

In addition, vehicle speed data is acquired (S26). The speed meter is a device that enables supplement of signals from a GPS and a GLONASS satellite. With the use of a GPS or the like, the speed, position, or mileage of a vehicle during driving can be measured. Furthermore, a numerical value that is obtained by a typical speed meter may be used as the vehicle speed data. Note that the timing of Step S26 is not particularly limited and may be any time between the start of data acquisition and Step S22.

Then, the cut-off size of distant size is determined (S27). The cut-off size is determined using data of the speed meter that is obtained in Step S26. For example, a structure is employed in which a cut-off area is large in the case of high speed compared to the case of low speed.

Then, data is reduced to data of only the distant region (S28).

After that, super-resolution inference is performed on the data of only the distant region (S29). Note that super-resolution processing refers to image processing for generating a high-resolution image from a low-resolution image. Super-resolution processing may be repeated more than once. For creation of a learning model for determining a color boundary, by mixing of not only a color picture image but also a color illustration (animation) image as training data, colored image data with a clear color boundary can be obtained. Accordingly, an illustration (animation) image is preferably mixed into training data during learning, and a super-resolution weight to be used as a weight coefficient of neural network processing is calculated. In this embodiment, inference is performed inside the vehicle; thus, a feature value learned in advance (a super-resolution weight) is used.

Then, colorization inference is performed (S30). In this embodiment, inference is performed inside the vehicle; thus, a feature value learned in advance (a colorization weight) is used.

The sequence of performing colorization inference after super-resolution inference is also important. It is preferable that arithmetic operation be performed using monochrome image data and colorization be performed as final image processing. The monochrome image data has a smaller data amount than image data that has color information, and a load on processing capacity of an arithmetic unit can be reduced.

Finally, the colorization image is enlarged on a display portion of a display device as a highlighted image (S31).

Acquisition of the highlighted image is repeated.

In this embodiment, as a method for selectively extracting a distant region, first neural network processing is performed for depth estimation, second neural network processing is performed for segmentation inference, third neural network processing is performed for super-resolution inference, and fourth neural network processing is performed for colorization inference.

A feature value learned in advance is used in each of these inferences; thus, arithmetic operation is performed inside the vehicle. A wide area is enlarged and subjected to super-resolution processing in the case of high speed; thus, clear highlighting can be obtained.

This embodiment can be freely combined with Embodiment 1 or Embodiment 2.

Embodiment 4

Figure 4:
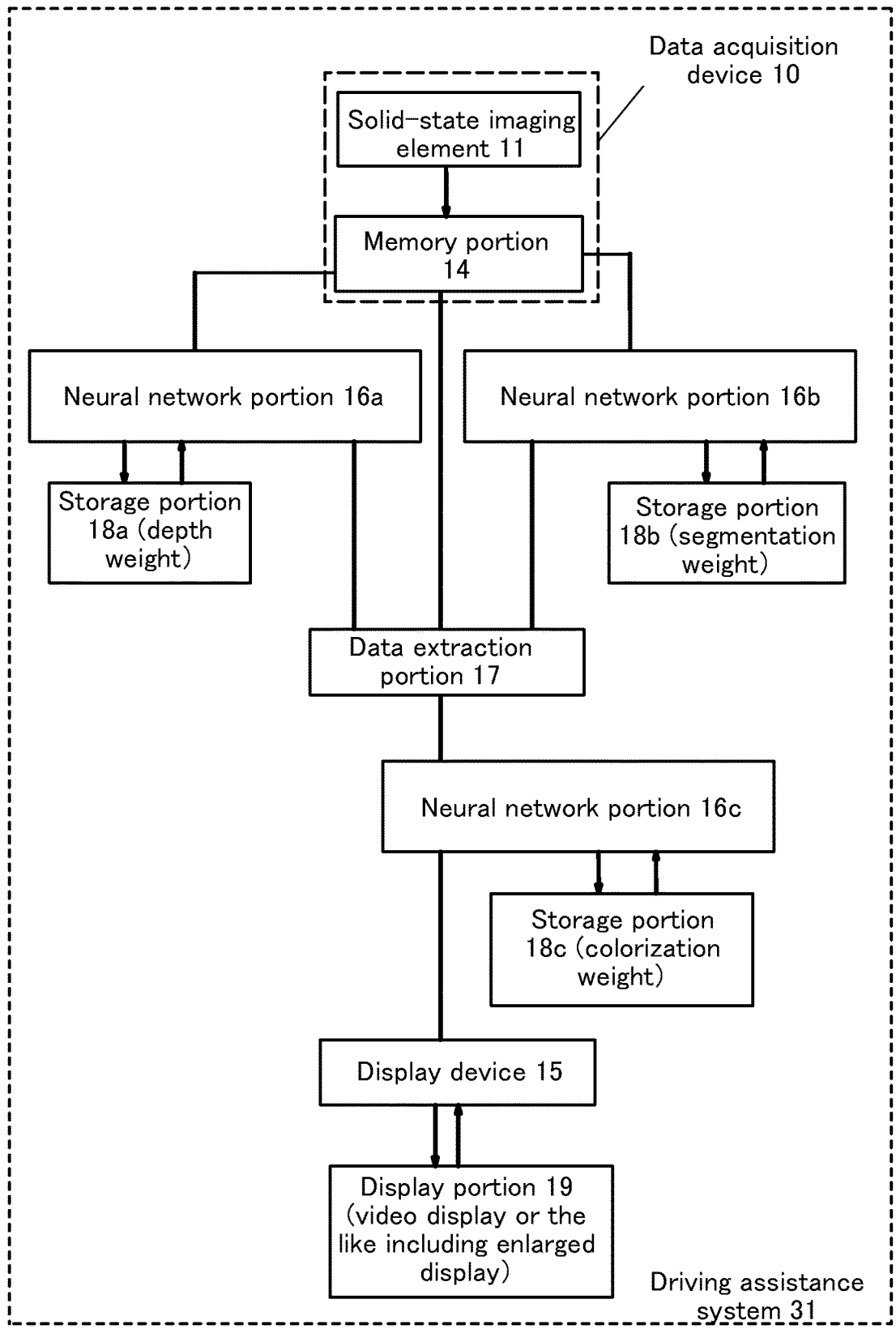
FIG. 4 is a block diagram illustrating one embodiment of the present invention.

In this embodiment, an example of a block diagram of a driving assistance system 31 that executes the flow chart in Embodiment 2 is described. FIG. 4 is a block diagram of the driving assistance system 31, and the following description is made with reference to FIG. 4.

A data acquisition device 10 is a semiconductor chip that includes a solid-state imaging element 11 and a memory portion 14 and does not include a color filter. The data acquisition device 10 includes an optical system such as a lens. Note that the optical system is not particularly limited as long as imaging characteristics are known, and an optical system with any structure may be employed.

For example, as the data acquisition device 10, one semiconductor chip where a back-illuminated CMOS image sensor chip, a DRAM chip, and a logic circuit chip are stacked may be used. In addition, one semiconductor chip where a back-illuminated CMOS image sensor chip and a logic circuit chip including an analog/digital converter circuit are stacked may be used. In that case, the memory portion 14 is an SRAM. Furthermore, chips to be stacked are stacked using a known bonding technology to achieve electrical connection.

The memory portion 14 is a circuit that stores digital data after conversion and has a structure in which data is stored before input to neural network portions 16a, 16b, and 16c; however, the present invention is not limited to this structure.

The neural network portions 16a, 16b, and 16c are achieved by software calculation with a microcontroller. The microcontroller is obtained by incorporating a computer system into one integrated circuit (IC). When the calculation scale or data to be handled is large, a plurality of ICs are combined to form the neural network portions 16a, 16b, and 16c. A learning device includes at least the plurality of ICs. In addition, it is preferable to use a microcontroller incorporating Linux (registered trademark) that enables use of free software because the total cost of forming the neural network portions 16a, 16b, and 16c can be reduced. Furthermore, another OS (operating system) may be used without being limited to Linux (registered trademark).

Learning of the neural network portions 16a, 16b, and 16c illustrated in FIG. 4 is described below. In this embodiment, learning is performed in advance, and neural network processing is performed utilizing a weight. Training data for learning can be stored in storage portions 18a, 18b, and 18c so that learning can also be performed as appropriate.

In Embodiment 2, only a distant region is selected based on output results of the neural network portions 16a and 16b so that data is reduced. A data extraction portion 17 can also be referred to as a data control portion that selects only a distant region and reduces data. Data extracted by the data extraction portion 17 is input to the neural network portion 16c so that colorization is performed.

Data output from the neural network portion 16c has information on an edge and a color of an object that is related to an area for only the distant region and is input to a display device 15. The display device 15 includes a display portion 19 and forms a signal showing a video including enlargement in accordance with a gray scale level that can be displayed or a screen size.

In addition, a fellow passenger's portable information terminal (a smartphone or the like) can be the display device 15, and a display portion of the portable information terminal can be the display portion 19. In that case, a transmission/reception portion for transmitting an output from the neural network portion 16c to the fellow passenger's portable information terminal needs to be incorporated in a vehicle. It is needless to say that, without limitation to the fellow passenger, a driver's portable information terminal (a smartphone or the like) may be placed in a hood or the like so that the driver can see the video.

The driving assistance system 31 can particularly prevent accidents in a dark place with little lighting, such as in the evening or at night.

This embodiment can be freely combined with Embodiment 1, Embodiment 2, or Embodiment 3.

Embodiment 5

This embodiment illustrates a modification example where part of Embodiment 4 is changed. Note that description is made using the same reference numerals for the same portions as those in Embodiment 4. Structures of components below the memory portion 14 are the same as those in Embodiment 4; thus, description thereof is omitted here.

A structure example of an imaging system 41 is described with reference to a block diagram illustrated in FIG. 5.

The data acquisition device 10 is a semiconductor chip that includes the solid-state imaging element 11 and the analog arithmetic circuit 12 and does not include a color filter. The data acquisition device 10 includes an optical system such as a lens. Note that the optical system is not particularly limited as long as imaging characteristics are known, and an optical system with any structure may be employed.

In addition, a transistor using a metal oxide formed over a silicon chip of a solid-state imaging element formed using a silicon substrate (hereinafter, an OS transistor) or the like can be used for the analog arithmetic circuit 12.

An A/D circuit 13 (also referred to as an A/D converter) illustrates an analog-to-digital conversion circuit and converts analog data output from the data acquisition device 10 into digital data. Note that if needed, an amplifier circuit may be provided between the data acquisition device 10 and the A/D circuit 13 so that an analog signal is amplified before conversion into the digital data.

The memory portion 14 is a circuit that stores digital data after conversion and has a structure in which data is stored before input to the neural network portions 16a, 16b, and 16c; however, the present invention is not limited to this structure. Although it depends on the amount of data output from the data acquisition device or the data processing capacity of an image processing device, a structure may be employed in which small-scale data output from the A/D circuit 13 is directly input to the neural network portions 16a, 16b, and 16c, without storing the small-scale data in the memory portion 14.

Figure 5:
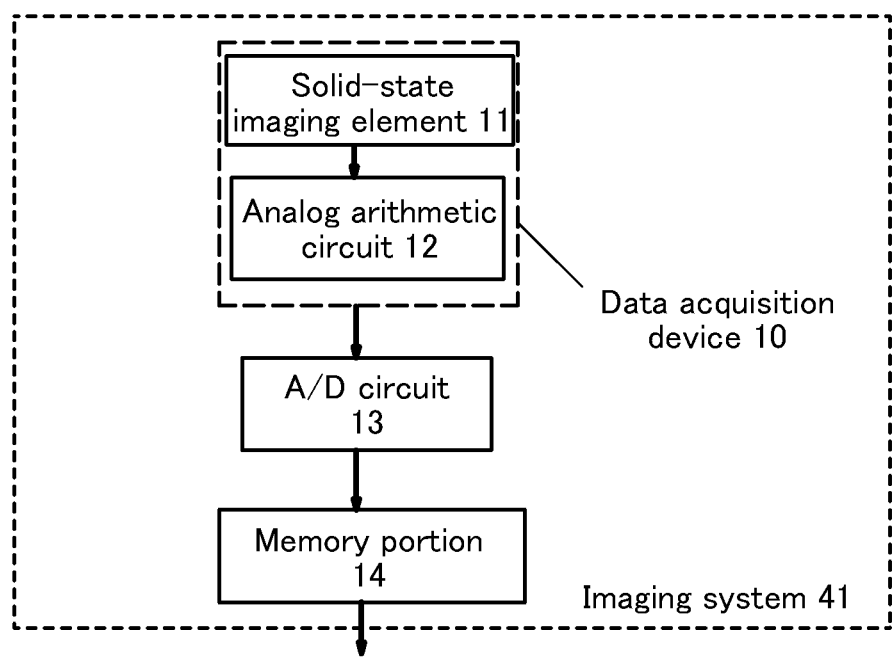
FIG. 5 is a block diagram illustrating one embodiment of the present invention.

In this embodiment, owing to the analog arithmetic circuit illustrated in FIG. 5, part of arithmetic operation that is performed in common among the neural network portions 16a, 16b, and 16c can be performed in advance. The use of the imaging system 41 illustrated in FIG. 5 can reduce the number of arithmetic operations performed in the neural network portions 16a, 16b, and 16c.

This embodiment can be freely combined with Embodiment 1, Embodiment 2, Embodiment 3, or Embodiment 4.

Embodiment 6

Figure 6:
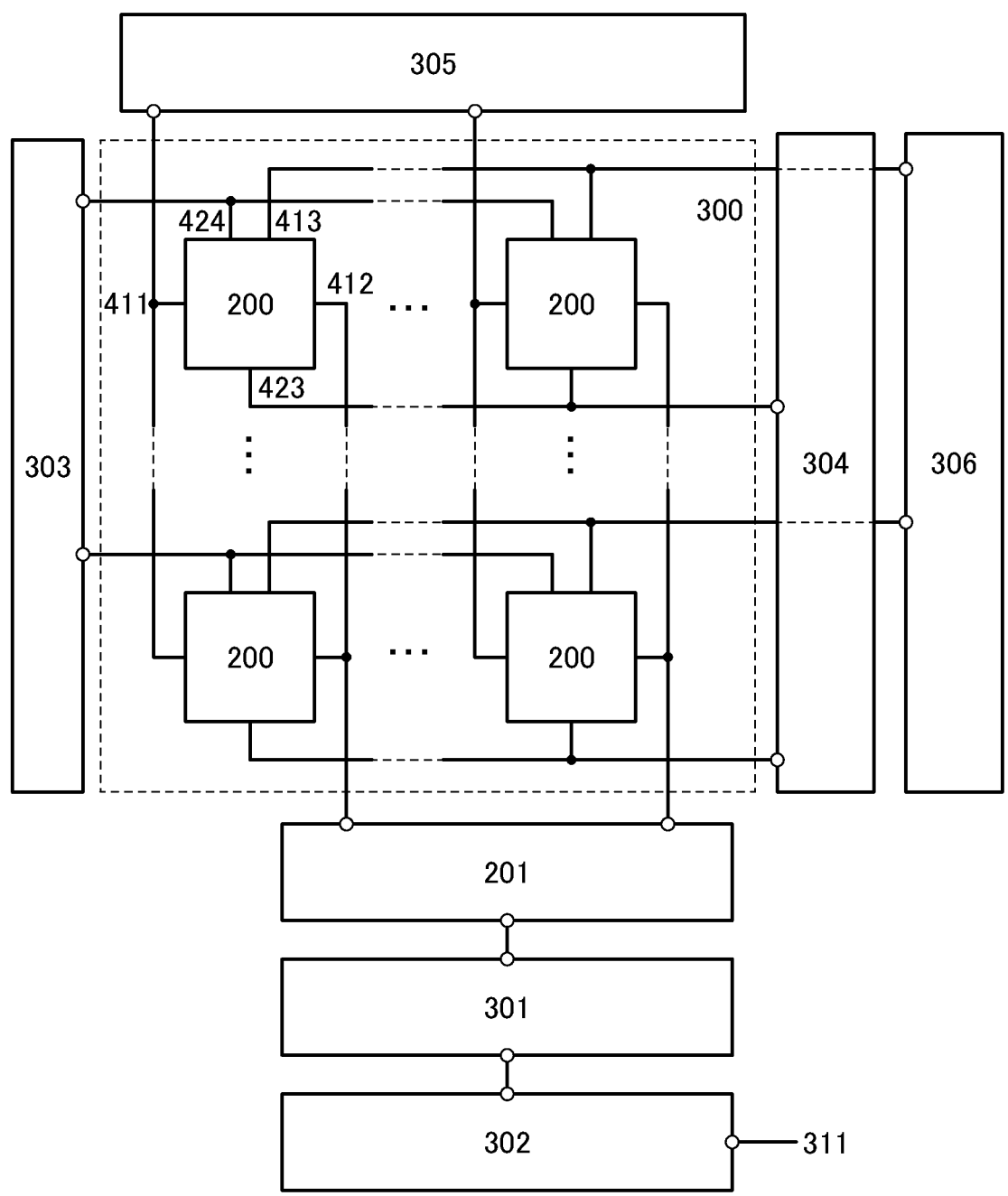
FIG. 6 is a block diagram illustrating a structure example of an imaging portion.

In this embodiment, a structure example where the data acquisition device 10 is part of the structure of the imaging system 41 is described below. FIG. 6 is a block diagram illustrating the imaging system 41.

The imaging system 41 includes a pixel array 300, a circuit 201, a circuit 301, a circuit 302, a circuit 303, a circuit 304, a circuit 305, and a circuit 306. Note that each of the structures of the circuit 201 and the circuit 301 to the circuit 306 is not limited to a single circuit structure and is sometimes composed of a combination of a plurality of circuits. Alternatively, any of the plurality of circuits described above may be combined. Furthermore, a circuit other than the above circuits may be connected.

The pixel array 300 has an imaging function and an arithmetic function. The circuit 201 and the circuit 301 each have an arithmetic function. The circuit 302 has an arithmetic function or a data conversion function. The circuit 303, the circuit 304, and the circuit 306 each have a selection function. The circuit 303 is electrically connected to a pixel block 200 through a wiring 424. The circuit 304 is electrically connected to the pixel block 200 through a wiring 423. The circuit 305 has a function of supplying a potential for product-sum operation to a pixel. As a circuit having a selection function, a shift register, a decoder, or the like can be used. The circuit 306 is electrically connected to the pixel block 200 through a wiring 413. Note that the circuit 301 and the circuit 302 may be provided outside.

Figure 7:
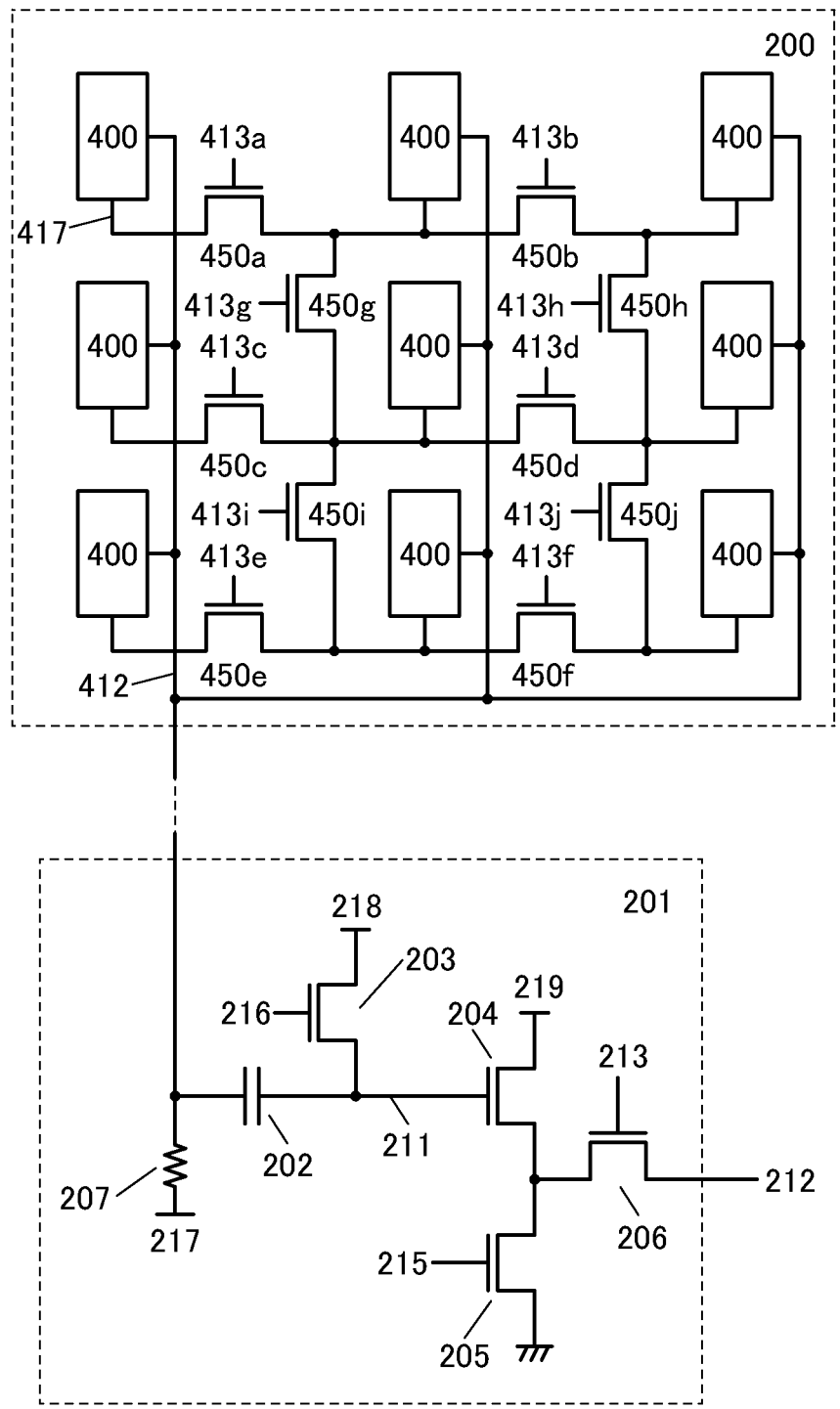
FIG. 7 is a diagram illustrating structure examples of a pixel block 200 and a circuit 201.

The pixel array 300 includes a plurality of pixel blocks 200. As illustrated in FIG. 7, the pixel block 200 includes a plurality of pixels 400 arranged in a matrix, and each of the pixels 400 is electrically connected to the circuit 201 through a wiring 412. Note that the circuit 201 can also be provided in the pixel block 200.

Furthermore, the pixels 400 are electrically connected to adjacent pixels 400 through transistors 450 (a transistor 450a to a transistor 450f). The functions of the transistors 450 are described later.

The pixels 400 can acquire image data and generate data obtained by adding the image data and a weight coefficient. Note that the number of pixels included in the pixel block 200 is 3×3 in an example illustrated in FIG. 7 but is not limited to this. For example, the number of pixels can be 2×2, 4×4, or the like. Alternatively, the number of pixels in a horizontal direction and the number of pixels in a vertical direction may differ from each other. Furthermore, some pixels may be shared by adjacent pixel blocks. Although ten transistors 450 (transistors 450a to 450j) are provided between the pixels 400 in the examples illustrated in FIG. 7, the number of transistors 450 may be further increased. In addition, in the transistors 450g to 450j, some transistors may be omitted so that a parallel path is canceled. Wirings 413g to 413j are respectively connected to the transistors 450g to 450j as gates.

The pixel block 200 and the circuit 201 can operate as a product-sum operation circuit.

Figure 8:
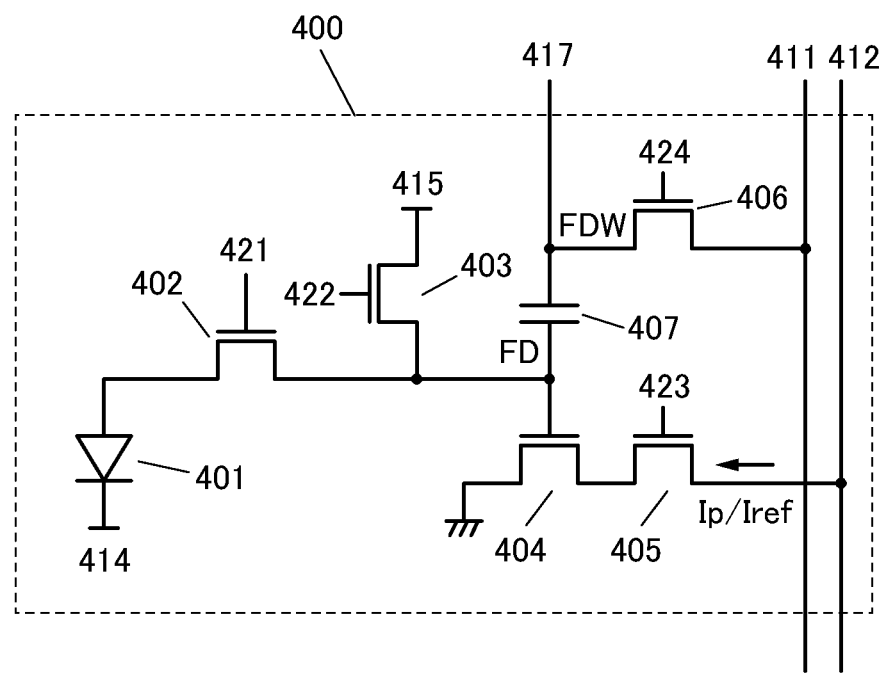
FIG. 8 is a diagram illustrating a pixel structure example.

As illustrated in FIG. 8, the pixel 400 can include a photoelectric conversion device 401, a transistor 402, a transistor 403, a transistor 404, a transistor 405, a transistor 406, and a capacitor 407.

One electrode of the photoelectric conversion device 401 is electrically connected to one of a source and a drain of the transistor 402. The other of the source and the drain of the transistor 402 is electrically connected to one of a source and a drain of the transistor 403, a gate of the transistor 404, and one electrode of the capacitor 407. One of a source and a drain of the transistor 404 is electrically connected to one of a source and a drain of the transistor 405. The other electrode of the capacitor 407 is electrically connected to one of a source and a drain of the transistor 406.

The other electrode of the photoelectric conversion device 401 is electrically connected to a wiring 414. The other of the source and the drain of the transistor 403 is electrically connected to a wiring 415. The other of the source and the drain of the transistor 405 is electrically connected to the wiring 412. The other of the source and the drain of the transistor 404 is electrically connected to a GND wiring or the like. The other of the source and the drain of the transistor 406 is electrically connected to a wiring 411. The other electrode of the capacitor 407 is electrically connected to a wiring 417.

A gate of the transistor 402 is electrically connected to a wiring 421. A gate of the transistor 403 is electrically connected to a wiring 422. A gate of the transistor 405 is electrically connected to the wiring 423. A gate of the transistor 406 is electrically connected to the wiring 424.

Here, a point where the other of the source and the drain of the transistor 402, the one of the source and the drain of the transistor 403, the one electrode of the capacitor 407, and the gate of the transistor 404 are electrically connected is referred to as a node FD. Furthermore, a point where the other electrode of the capacitor 407 and the one of the source and the drain of the transistor 406 are electrically connected is referred to as a node FDW.

The wiring 414 and the wiring 415 can each have a function of a power supply line. For example, the wiring 414 can function as a high potential power supply line, and the wiring 415 can function as a low potential power supply line. The wiring 421, the wiring 422, the wiring 423, and the wiring 424 can function as signal lines that control the conduction of the respective transistors. The wiring 411 can function as a wiring for supplying a potential corresponding to a weight coefficient to the pixel 400. The wiring 412 can function as a wiring that electrically connects the pixel 400 and the circuit 201. The wiring 417 can function as a wiring that electrically connects the other electrode of the capacitor 407 of the pixel 400 and the other electrode of the capacitor 407 of another pixel 400 through the transistor 450 (see FIG. 7).

Note that an amplifier circuit or a gain control circuit may be electrically connected to the wiring 412.

As the photoelectric conversion device 401, a photodiode can be used. There is no limitation on types of photodiodes, and it is possible to use a Si photodiode in which a photoelectric conversion layer contains silicon, an organic photodiode in which a photoelectric conversion layer includes an organic photoconductive film, or the like. Note that in order to increase light detection sensitivity under low illuminance conditions, an avalanche photodiode is preferably used.

The transistor 402 can have a function of controlling the potential of the node FD. The transistor 403 can have a function of initializing the potential of the node FD. The transistor 404 can have a function of controlling current fed by the circuit 201 in accordance with the potential of the node FD. The transistor 405 can have a function of selecting a pixel. The transistor 406 can have a function of supplying the potential corresponding to the weight coefficient to the node FDW.

In the case where an avalanche photodiode is used as the photoelectric conversion device 401, high voltage is sometimes applied and thus a transistor with high breakdown voltage is preferably used as a transistor connected to the photoelectric conversion device 401. As the transistor with high breakdown voltage, a transistor using a metal oxide in its channel formation region (hereinafter an OS transistor) or the like can be used, for example. Specifically, an OS transistor is preferably employed as the transistor 402.

An OS transistor also has a feature of extremely low off-state current. When OS transistors are used as the transistor 402, the transistor 403, and the transistor 406, the charge retention period of the node FD and the node FDW can be lengthened greatly. Therefore, a global shutter mode in which charge accumulation operation is performed in all the pixels at the same time can be employed without complicating the circuit structure and the operation method. Furthermore, while image data is retained at the node FD, arithmetic operation using the image data can be performed more than once.

Meanwhile, it is sometimes desirable that the transistor 404 have excellent amplifying characteristics. In addition, a transistor having high mobility capable of high-speed operation is sometimes preferably used as the transistor 406. Accordingly, transistors using silicon in their channel formation regions (hereinafter Si transistors) may be employed as the transistor 404 and the transistor 406.

Note that without limitation to the above, an OS transistor and a Si transistor may be freely employed in combination. Alternatively, all the transistors may be OS transistors. Alternatively, all the transistors may be Si transistors. Examples of Si transistors include a transistor including amorphous silicon, a transistor including crystalline silicon (microcrystalline silicon, low-temperature polysilicon, or single crystal silicon), and the like.

The potential of the node FD in the pixel 400 is determined by the potential obtained by adding a reset potential supplied from the wiring 415 and a potential (image data) generated by photoelectric conversion by the photoelectric conversion device 401. Alternatively, the potential of the node FD in the pixel 400 is determined by capacitive coupling of the potential corresponding to a weight coefficient supplied from the wiring 411. Thus, current corresponding to data in which a given weight coefficient is added to the image data can flow through the transistor 405.

Note that the circuit structures of the pixel 400 described above are examples, and the photoelectric conversion operation can also be performed with other circuit structures.

As illustrated in FIG. 7, the pixels 400 are electrically connected to each other through the wiring 412. The circuit 201 can perform arithmetic operation using the sum of currents flowing through the transistors 404 of the pixels 400.

The circuit 201 includes a capacitor 202, a transistor 203, a transistor 204, a transistor 205, a transistor 206, and a resistor 207.

One electrode of the capacitor 202 is electrically connected to one of a source and a drain of the transistor 203. The one of the source and the drain of the transistor 203 is electrically connected to a gate of the transistor 204. One of a source and a drain of the transistor 204 is electrically connected to one of a source and a drain of the transistor 205. The one of the source and the drain of the transistor 205 is electrically connected to one of a source and a drain of the transistor 206. One electrode of the resistor 207 is electrically connected to the other electrode of the capacitor 202.

The other electrode of the capacitor 202 is electrically connected to the wiring 412. The other of the source and the drain of the transistor 203 is electrically connected to a wiring 218. The other of the source and the drain of the transistor 204 is electrically connected to a wiring 219. The other of the source and the drain of the transistor 205 is electrically connected to a reference power supply line such as a GND wiring. The other of the source and the drain of the transistor 206 is electrically connected to a wiring 212. The other electrode of the resistor 207 is electrically connected to a wiring 217.

The wiring 217, the wiring 218, and the wiring 219 can each have a function of a power supply line. For example, the wiring 218 can have a function of a wiring that supplies a potential dedicated to reading. The wiring 217 and the wiring 219 can function as high potential power supply lines. The wiring 213, the wiring 215, and the wiring 216 can function as signal lines for controlling the conduction of the respective transistors. The wiring 212 is an output line and can be electrically connected to the circuit 301 illustrated in FIG. 6, for example.

The transistor 203 can have a function of resetting the potential of the wiring 211 to the potential of the wiring 218. The wiring 211 is a wiring that is electrically connected to the one electrode of the capacitor 202, the one of the source and the drain of the transistor 203, and the gate of the transistor 204. The transistor 204 and the transistor 205 can have a function of a source follower circuit. The transistor 206 can have a function of controlling reading. The circuit 201 has a function of a correlated double sampling circuit (a CDS circuit) and can be replaced with a circuit having the function and another structure.

In one embodiment of the present invention, offset components other than the product of image data (X) and a weight coefficient (W) are eliminated, and an objective WX is extracted. WX can be calculated using data obtained when imaging is performed, data obtained when imaging is not performed, and data obtained by adding weights to the respective data.

The total amount of currents ($I_p$) flowing through the pixels 400 when imaging is performed is $k\Sigma(X-V_{th})^2$, and the total amount of currents ($I_p$) flowing through the pixels 400 when weights are added is $k\Sigma(W+X-V_{th})^2$. In addition, the total amount of currents ($I_{ref}$) flowing through the pixels 400 when imaging is not performed is $k\Sigma(0-V_{th})^2$, and the total amount of currents ($I_{ref}$) flowing through the pixels 400 when weights are added is $k\Sigma(W-V_{th})^2$. Here, k is a constant and $V_{th}$ is the threshold voltage of the transistor 405.

First, a difference (data A) between the data obtained when imaging is performed and the data obtained by adding a weight to the data is calculated. The difference is $k\Sigma((X-V_{th})^2-(W+X-V_{th})^2)=k\Sigma(-W^2-2W\cdot X+2\ W\cdot V_{th})$.

Next, a difference (data B) between the data obtained when imaging is not performed and the data obtained by adding a weight to the data is calculated. The difference is $k\Sigma((0-V_{th})^2-(W-V_{th})^2)=k\Sigma(-W^2+2\ W\cdot V_{th})$.

Then, a difference between the data A and the data B is calculated. The difference is $k\Sigma(-W^2-2W\cdot X+2\ W\cdot V_{th}-(-W^2+2\ W\cdot V_{th}))=k\Sigma(-2W\cdot X)$. That is, offset components other than the product of the image data (X) and the weight coefficient (W) can be eliminated.

The circuit 201 can read the data A and the data B. Note that the calculation of the difference between the data A and the data B can be performed by the circuit 301, for example.

Here, the weights supplied to the entire pixel block 200 function as a filter. As the filter, a convolutional filter of a convolutional neural network (CNN) can be used, for example. Alternatively, an image processing filter such as an edge extraction filter can be used. As examples of the edge extraction filter, a Laplacian filter illustrated in FIG. 9A, a Prewitt filter illustrated in FIG. 9B, a Sobel filter illustrated in FIG. 9C, and the like can be given.

In the case where the number of pixels 400 included in the pixel block 200 is 3×3, elements of the edge extraction filter can be assigned and supplied as weights to the pixels 400. As described above, to calculate the data A and the data B, data obtained when imaging is performed, data obtained when imaging is not performed, and data obtained by adding weights to the respective data can be utilized for the calculation. Here, the data obtained when imaging is performed and the data obtained when imaging is not performed are data to which weights are not added and can also be referred to as data obtained by adding a weight 0 to all the pixels 400.

The edge extraction filters illustrated as examples in FIG. 9A to FIG. 9C are filters where the sum ($\Sigma\Delta W/N$, where N is the number of elements) of elements (weights: $\Delta W$) is 0. Therefore, without additional operation of supplying $\Delta W=0$ from another circuit, the operation of obtaining $\Sigma\Delta W/N$ enables data corresponding to the data obtained by adding $\Delta W=0$ to all the pixels 400 to be acquired.

This operation corresponds to turning on the transistors 450 (the transistors 450a to 450f) provided between the pixels 400 (see FIG. 7). By turning on the transistors 450, the node FDW in each of the pixels 400 is short-circuited through the wiring 417. At this time, charge accumulated in the node FDW in each of the pixels 400 is redistributed, and in the case where the edge extraction filters illustrated as examples in FIG. 9A to FIG. 9C are used, the potential of the node FDW ($\Delta W$) becomes 0 or substantially 0. Thus, the data corresponding to the data obtained by adding $\Delta W=0$ can be acquired.

Note that in the case of rewriting weights ($\Delta W$) by supplying charge from a circuit outside the pixel array 300, it takes time to complete rewriting owing to the capacitance of the long-distance wiring 411 or the like. In contrast, the pixel block 200 is a minute region, and the wiring 417 has a short distance and small capacitance. Therefore, weights ($\Delta W$) can be rewritten at high speed by the operation of redistributing charge accumulated in the nodes FDW in the pixel block 200.

In the pixel block 200 illustrated in FIG. 7, a structure where the transistor 450a to the transistor 450f are electrically connected to different gate lines (a wiring 413a to a wiring 413f) is illustrated. With this structure, the conductions of the transistor 450a to the transistor 450f can be controlled independently of each other, and the operation of obtaining $\Sigma\Delta W/N$ can be performed selectively.

For example, in the case of using a filter illustrated in FIG. 9B, FIG. 9C, or the like, there are some pixels where $\Delta W=0$ is initially supplied. Assuming that $\Sigma\Delta W/N=0$, the pixels where $\Delta W=0$ is supplied may be excluded from the target of summation. The exclusion of the pixels eliminates the need of supplying a potential for operating some of the transistors 450a to the transistor 450f, which can reduce power consumption.

Product-sum operation result data output from the circuit 201 is sequentially input to the circuit 301. The circuit 301 may have a variety of arithmetic functions in addition to the above-described function of calculating the difference between the data A and the data B. For example, the circuit 301 can have a structure similar to that of the circuit 201. Alternatively, the function of the circuit 301 may be replaced by software processing.

In addition, the circuit 301 may include a circuit that performs arithmetic operation of an activation function. A comparator circuit can be used as the circuit, for example. A comparator circuit outputs a result of comparing input data and a set threshold as binary data. In other words, the pixel blocks 200 and the circuit 301 can operate as some components of a neural network.

Data output from the circuit 301 is sequentially input to the circuit 302. The circuit 302 can have a structure including a latch circuit, a shift register, and the like, for example. With this structure, parallel-serial conversion can be performed and data input in parallel can be output to a wiring 311 as serial data.

Pixel Structure Example

Figure 10A:
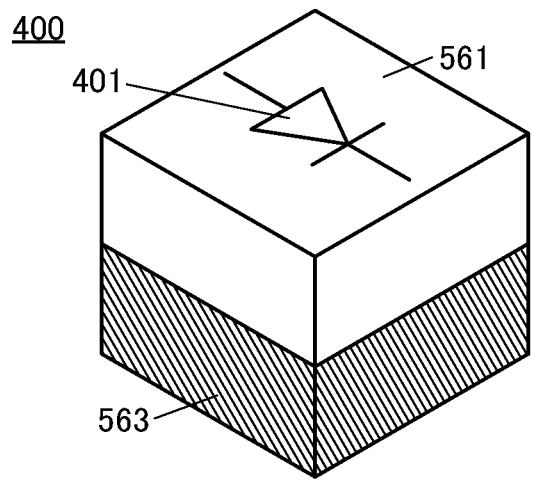
FIG. 10A is a diagram illustrating a pixel structure example.

FIG. 10A is a diagram illustrating a structure example of the pixel 400. The pixel 400 can have a stack structure of a layer 561 and a layer 563.

Figure 10B:
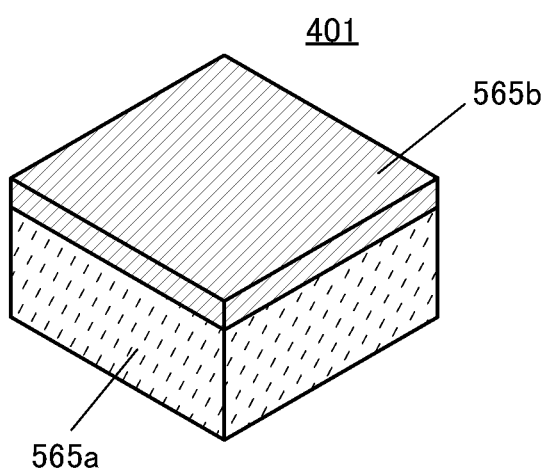
FIG. 10B to FIG. 10D are diagrams each illustrating a structure example of a photoelectric conversion device.

The layer 561 includes the photoelectric conversion device 401. The photoelectric conversion device 401 can include a layer 565a and a layer 565b, as illustrated in FIG. 10B. Note that a layer may be rephrased as a region, depending on the case.

The photoelectric conversion device 401 illustrated in FIG. 10B is a pn-junction photodiode; for example, a p-type semiconductor can be used for the layer 565a, and an n-type semiconductor can be used for the layer 565b. Alternatively, an n-type semiconductor may be used for the layer 565a, and a p-type semiconductor may be used for the layer 565b.

The pn junction photodiode can be formed typically using single crystal silicon.

Figure 10C:
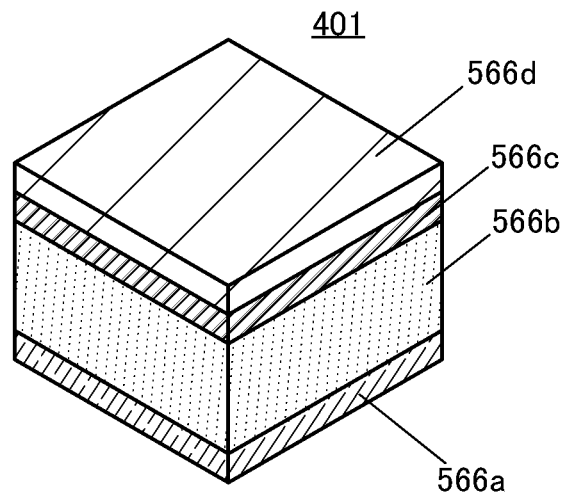

In addition, the photoelectric conversion device 401 included in the layer 561 may have a stack of a layer 566a, a layer 566b, a layer 566c, and a layer 566d, as illustrated in FIG. 10C.

The photoelectric conversion device 401 illustrated in FIG. 10C is an example of an avalanche photodiode; the layer 566a and the layer 566d correspond to electrodes, and the layer 566b and the layer 566c correspond to a photoelectric conversion portion.

The layer 566a is preferably a low-resistance metal layer or the like. For example, aluminum, titanium, tungsten, tantalum, silver, or a stack thereof can be used.

A conductive layer having a high light-transmitting property with respect to visible light is preferably used as the layer 566d. For example, indium oxide, tin oxide, zinc oxide, indium tin oxide, gallium zinc oxide, indium gallium zinc oxide, graphene, or the like can be used. Note that a structure in which the layer 566d is omitted can also be employed.

The layer 566b and the layer 566c of the photoelectric conversion portion can be used to form a pn-junction photodiode containing a selenium-based material in a photoelectric conversion layer, for example. A selenium-based material, which is a p-type semiconductor, is preferably used for the layer 566b, and gallium oxide or the like, which is an n-type semiconductor, is preferably used for the layer 566c.

A photoelectric conversion device containing a selenium-based material has characteristics of high external quantum efficiency with respect to visible light. In the photoelectric conversion device, electrons can be greatly amplified with respect to the amount of incident light by utilizing avalanche multiplication. In addition, a selenium-based material has a high light-absorption coefficient and thus has advantages in production; for example, a photoelectric conversion layer can be manufactured using a thin film. A thin film of a selenium-based material can be formed by a vacuum evaporation method, a sputtering method, or the like.

As a selenium-based material, crystalline selenium such as single crystal selenium or polycrystalline selenium, amorphous selenium, a compound of copper, indium, and selenium (CIS), a compound of copper, indium, gallium, and selenium (CIGS), or the like can be used.

An n-type semiconductor is preferably formed using a material with a wide band gap and a light-transmitting property with respect to visible light. For example, zinc oxide, gallium oxide, indium oxide, tin oxide, a mixed oxide thereof, or the like can be used. In addition, these materials have a function of a hole-injection blocking layer, so that dark current can be decreased.

Figure 10D:
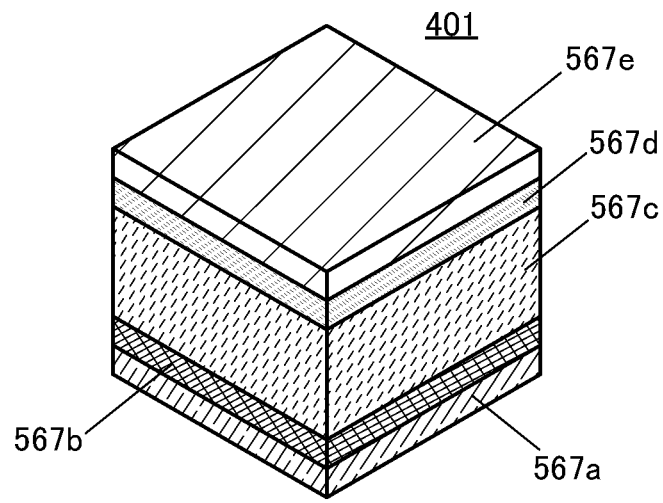

In addition, the photoelectric conversion device 401 included in the layer 561 may have a stack of a layer 567a, a layer 567b, a layer 567c, a layer 567d, and a layer 567e, as illustrated in FIG. 10D. The photoelectric conversion device 401 illustrated in FIG. 10D is an example of an organic photoconductive film; the layer 567a is a lower electrode, the layer 567e is an upper electrode having a light-transmitting property, and the layer 567b, the layer 567c, and the layer 567d correspond to a photoelectric conversion portion.

One of the layer 567b and the layer 567d of the photoelectric conversion portion can be a hole-transport layer. In addition, the other of the layer 567b and the layer 567d can be an electron-transport layer. Furthermore, the layer 567c can be a photoelectric conversion layer.

For the hole-transport layer, molybdenum oxide or the like can be used, for example. For the electron-transport layer, for example, fullerene such as $C_{60}$ or $C_{70}$, a derivative thereof, or the like can be used.

As the photoelectric conversion layer, a mixed layer of an n-type organic semiconductor and a p-type organic semiconductor (a bulk heterojunction structure) can be used.

For example, the layer 563 illustrated in FIG. 10A includes a silicon substrate. The silicon substrate can be provided with a Si transistor or the like. With the use of the Si transistor, the pixel 400 can be formed. In addition, a circuit 201 and a circuit 301 to a circuit 306 that are illustrated in FIG. 6 can be formed.

Next, a stack structure of the imaging device is described using a cross-sectional view. Note that components such as insulating layers and conductive layers are described below as examples, and other components may be further included. Alternatively, some components described below may be omitted. In addition, a stack structure described below can be formed by a bonding process, a polishing process, or the like as needed.

Figure 11:
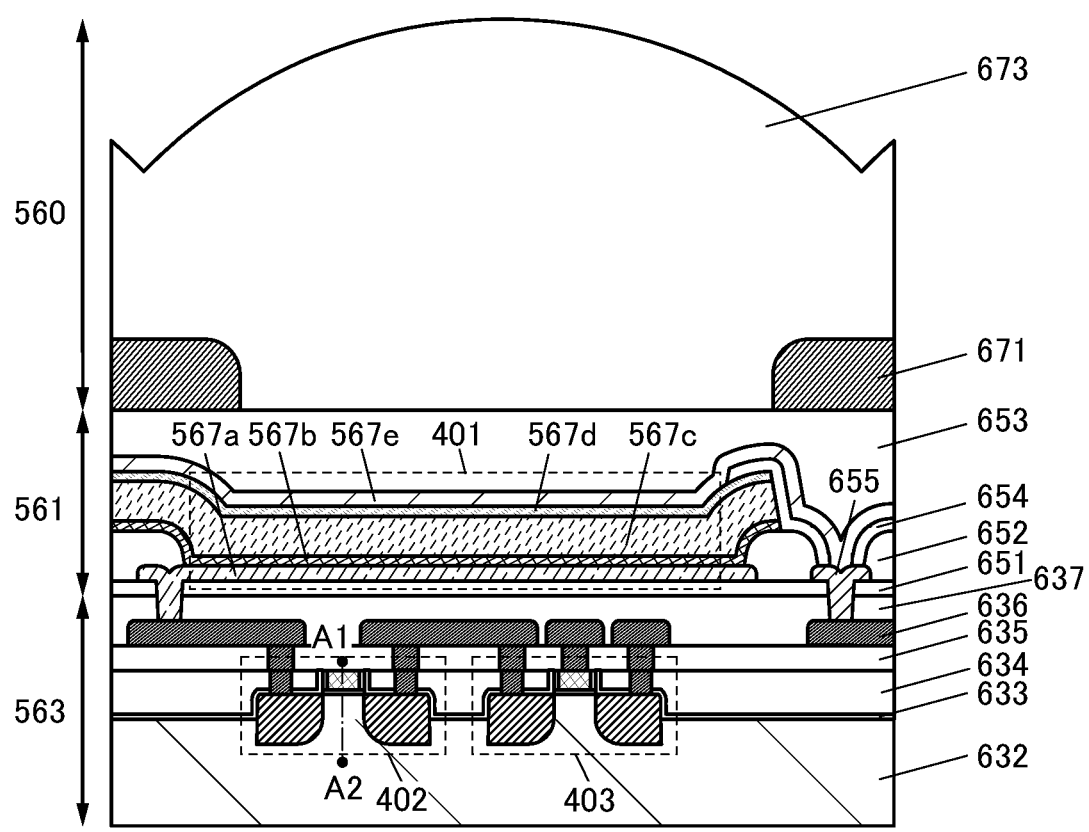
FIG. 11 is a cross-sectional view illustrating a structure example of an imaging device.

An imaging device with a structure illustrated in FIG. 11 includes a layer 560, the layer 561, and the layer 563. Although FIG. 11 illustrates the transistor 402 and the transistor 403 as components provided in the layer 563, other components such as the transistor 404 to the transistor 406 can also be provided in the layer 563.

A silicon substrate 632, an insulating layer 633, an insulating layer 634, an insulating layer 635, and an insulating layer 637 are provided in the layer 563. Moreover, a conductive layer 636 is provided.

The insulating layer 634, the insulating layer 635, and the insulating layer 637 have functions of interlayer insulating films and planarization films. The insulating layer 633 has a function of a protective film. The conductive layer 636 is electrically connected to the wiring 414 illustrated in FIG. 8.

As the interlayer insulating film and the planarization film, for example, an inorganic insulating film such as a silicon oxide film or an organic insulating film of an acrylic resin, a polyimide resin, or the like can be used. As the protective film, for example, a silicon nitride film, a silicon oxide film, an aluminum oxide film, or the like can be used.

For a conductive layer, a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, lanthanum, and the like; an alloy containing the above metal element; an alloy containing a combination of the above metal elements; or the like is selected as appropriate and used. The conductor is not limited to a single layer, and may be a plurality of layers including different materials.

Figure 12A:
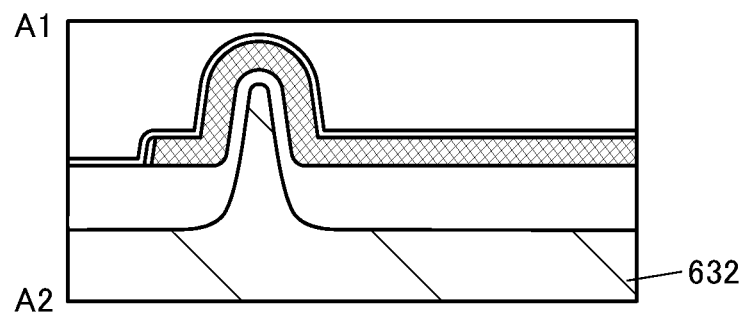
FIG. 12A to FIG. 12C are cross-sectional views each illustrating a transistor structure example.
Figure 12B:
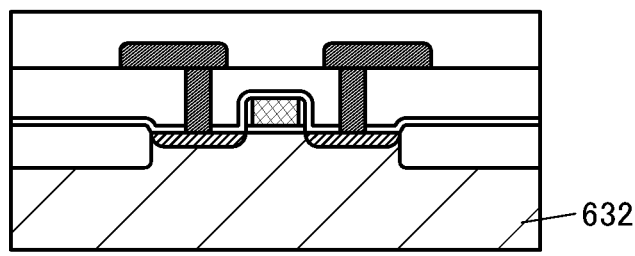

The Si transistors illustrated in FIG. 11 are FIN transistors each including a channel formation region in the silicon substrate. FIG. 12A illustrates a cross section in a channel width direction (a cross section along A1-A2 illustrated in the layer 563 in FIG. 11). Note that each of the Si transistors may be a planar transistor as illustrated in FIG. 12B.

Figure 12C:
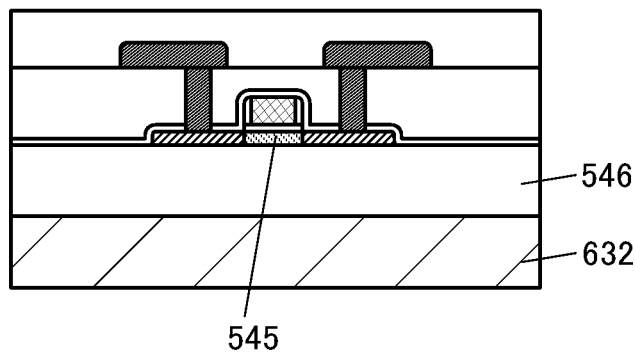

Alternatively, as illustrated in FIG. 12C, a transistor including a semiconductor layer 545 of a silicon thin film may be used. The semiconductor layer 545 can be single crystal silicon (SOI (Silicon on Insulator)) formed on an insulating layer 546 on the silicon substrate 632, for example.

The photoelectric conversion device 401 is provided in the layer 561. The photoelectric conversion device 401 can be formed over the layer 563. FIG. 11 illustrates a structure where the photoelectric conversion device 401 uses the organic optical conductive film illustrated in FIG. 10D as the photoelectric conversion layer. Note that here, the layer 567a is a cathode, and the layer 567e is an anode.

An insulating layer 651, an insulating layer 652, an insulating layer 653, an insulating layer 654, and a conductive layer 655 are provided in the layer 561.

The insulating layer 651, the insulating layer 653, and the insulating layer 654 have functions of interlayer insulating films and planarization films. In addition, the insulating layer 654 is provided to cover an end portion of the photoelectric conversion device 401, and also has a function of preventing short circuit between the layer 567e and the layer 567a. The insulating layer 652 has a function of an element isolation layer. An organic insulating film or the like is preferably used as the element isolation layer.

The layer 567a corresponding to the cathode of the photoelectric conversion device 401 is electrically connected to the one of the source and the drain of the transistor 402 included in the layer 563. The layer 567e corresponding to the anode of the photoelectric conversion device 401 is electrically connected to the conductive layer 636 provided in the layer 563 through the conductive layer 655.

The layer 560 is formed over the layer 561. The layer 560 includes a light-blocking layer 671 and a microlens array 673.

The light-blocking layer 671 can suppress entry of light into an adjacent pixel. As the light-blocking layer 671, a metal layer of aluminum, tungsten, or the like can be used. In addition, the metal layer and a dielectric film having a function of an anti-reflection film may be stacked.

The microlens array 673 is provided over the photoelectric conversion device 401. The photoelectric conversion device 401 directly under the lens is irradiated with light passing through an individual lens of the microlens array 673. When the microlens array 673 is provided, collected light can be incident on the photoelectric conversion device 401; thus, photoelectric conversion can be efficiently performed. The microlens array 673 is preferably formed using a resin, glass, or the like having a high light transmitting property with respect to light with a wavelength subjected to imaging.

Figure 13:
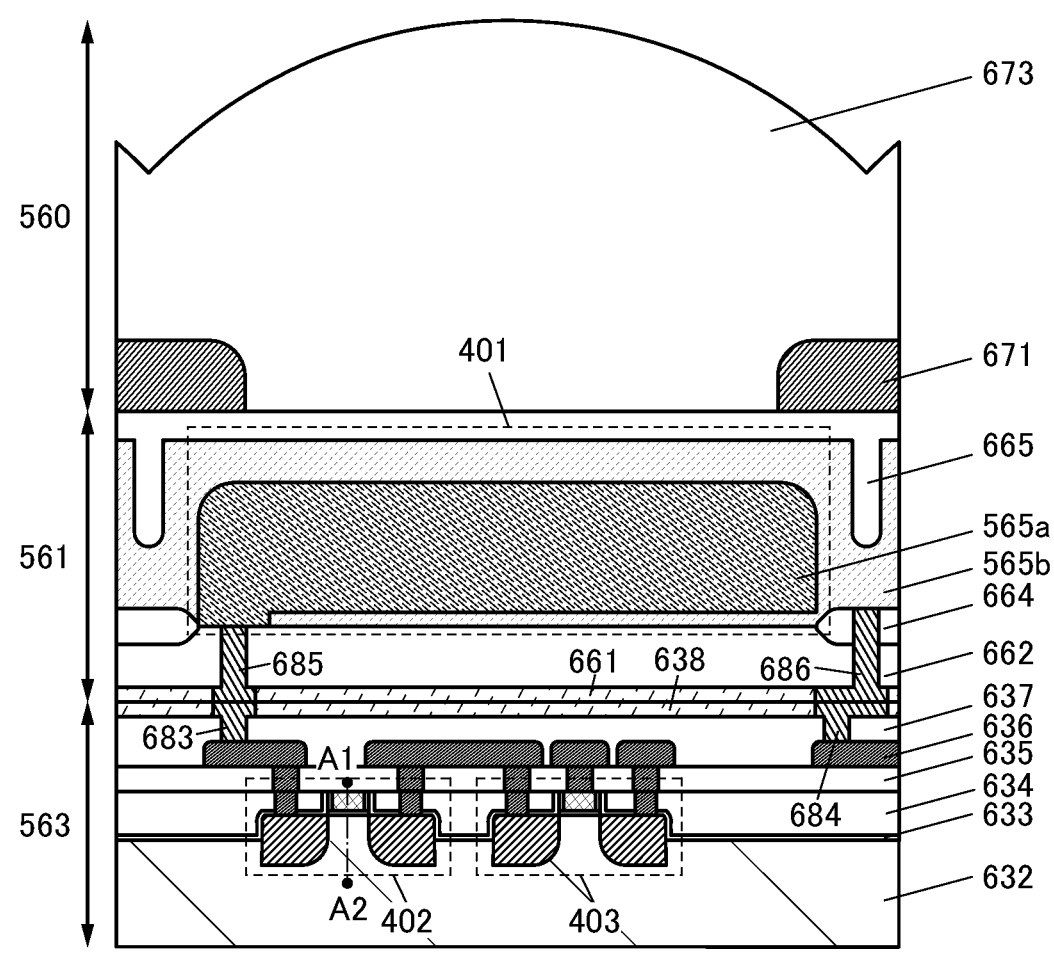
FIG. 13 is a cross-sectional view illustrating a structure example of an imaging device.

FIG. 13 is a modification example of the stack structure illustrated in FIG. 11. FIG. 13 differs from FIG. 11 in the structure of the photoelectric conversion device 401 included in the layer 561 and part of the structure of the layer 563. In the structure illustrated in FIG. 13, there is a bonding surface between the layer 561 and the layer 563.

The layer 561 includes the photoelectric conversion device 401, an insulating layer 661, an insulating layer 662, an insulating layer 664, an insulating layer 665, a conductive layer 685, and a conductive layer 686.

The photoelectric conversion device 401 is a pn junction photodiode formed on a silicon substrate and includes the layer 565b corresponding to a p-type region and the layer 565a corresponding to an n-type region. The photoelectric conversion device 401 is an embedded photodiode, which can suppress dark current and reduce noise with the thin p-type region (part of the layer 565b) provided on a surface side (current extraction side) of the layer 565a.

The insulating layer 661, the conductive layer 685, and the conductive layer 686 have functions of bonding layers. The insulating layer 662 has functions of an interlayer insulating film and a planarization film. The insulating layer 664 has a function of an element isolation layer. The insulating layer 665 has a function of suppressing carrier leakage.

The silicon substrate is provided with a groove that separates pixels, and the insulating layer 665 is provided on a top surface of the silicon substrate and in the groove. Providing the insulating layer 665 can suppress leakage of carriers generated in the photoelectric conversion device 401 to an adjacent pixel. In addition, the insulating layer 665 also has a function of suppressing entry of stray light. Therefore, color mixing can be suppressed with the insulating layer 665. Note that an anti-reflection film may be provided between the top surface of the silicon substrate and the insulating layer 665.

The element isolation layer can be formed by a LOCOS (LOCal Oxidation of Silicon) method. Alternatively, an STI (Shallow Trench Isolation) method or the like may be used to form the element isolation layer. As the insulating layer 665, for example, an inorganic insulating film of silicon oxide, silicon nitride, or the like or an organic insulating film of polyimide resin, acrylic resin, or the like can be used. Note that the insulating layer 665 may have a multilayer structure. Note that a structure without the element isolation layer may also be employed.

The layer 565a (corresponding to the n-type region and the cathode) of the photoelectric conversion device 401 is electrically connected to the conductive layer 685. The layer 565b (corresponding to the p-type region and the anode) is electrically connected to the conductive layer 686. The conductive layer 685 and the conductive layer 686 each include a region embedded in the insulating layer 661. Furthermore, surfaces of the insulating layer 661, the conductive layer 685, and the conductive layer 686 are planarized to be level with each other.

In the layer 563, the insulating layer 638 is formed over the insulating layer 637. In addition, a conductive layer 683 electrically connected to the one of the source and the drain of the transistor 402 and a conductive layer 684 electrically connected to the conductive layer 636 are formed.

The insulating layer 638, the conductive layer 683, and the conductive layer 684 have functions of bonding layers. The conductive layer 683 and the conductive layer 684 each include a region embedded in the insulating layer 638. Furthermore, surfaces of the insulating layer 638, the conductive layer 683, and the conductive layer 684 are planarized to be level with each other.

Here, main components of the conductive layer 683 and the conductive layer 685 are preferably formed using the same metal element, and main components of the conductive layer 684 and the conductive layer 686 are preferably formed using the same metal element. In addition, main components of the insulating layer 638 and the insulating layer 661 are preferably the same.

For the conductive layer 683 to the conductive layer 686, Cu, Al, Sn, Zn, W, Ag, Pt, Au, or the like can be used, for example. In particular, Cu, Al, W, or Au is used for easy bonding. In addition, for the insulating layer 638 and the insulating layer 661, silicon oxide, silicon oxynitride, silicon nitride oxide, silicon nitride, titanium nitride, or the like can be used.

That is, the same metal material described above is preferably used for the conductive layer 683 to the conductive layer 686. Furthermore, the same insulating material described above is preferably used for the insulating layer 638 and the insulating layer 661. With this structure, bonding where a boundary between the layer 563 and the layer 561 is a bonding position can be performed.

Note that the conductive layer 683 to the conductive layer 686 may each have a multilayer structure of a plurality of layers; in that case, outer layers (bonding surfaces) are formed of the same metal material. Furthermore, the insulating layer 638 and the insulating layer 661 may each have a multilayer structure of a plurality of layers; in that case, outer layers (bonding surfaces) are formed of the same insulating material.

With this bonding, the conductive layer 683 and the conductive layer 685 can be electrically connected to each other, and the conductive layer 684 and the conductive layer 686 can be electrically connected to each other. Moreover, connection between the insulating layer 661 and the insulating layer 638 with mechanical strength can be obtained.

For bonding metal layers to each other, a surface activated bonding method in which an oxide film, a layer adsorbing impurities, and the like on a surface are removed by sputtering processing or the like and cleaned and activated surfaces are brought into contact to be bonded to each other can be used. Alternatively, a diffusion bonding method in which surfaces are bonded to each other by using temperature and pressure together, or the like can be used. Both methods cause bonding at an atomic level, and therefore not only electrically but also mechanically excellent bonding can be obtained.

Furthermore, for bonding insulating layers to each other, a hydrophilic bonding method or the like can be used; in the method, after high planarity is obtained by polishing or the like, surfaces subject to hydrophilic treatment with oxygen plasma or the like are arranged in contact with and bonded to each other temporarily, and then dehydrated by heat treatment to perform final bonding. The hydrophilic bonding method also causes bonding at an atomic level; thus, mechanically excellent bonding can be obtained.

When the layer 563 and the layer 561 are bonded to each other, the metal layers and the insulating layers coexist on their bonding surfaces; therefore, the surface activated bonding method and the hydrophilic bonding method are performed in combination, for example.

For example, a method or the like can be used in which the surfaces are made clean after polishing, the surfaces of the metal layers are subjected to anti-oxidation treatment and then hydrophilicity treatment, and bonding is performed. Furthermore, hydrophilic treatment may be performed on the surfaces of the metal layers being hardly oxidizable metal such as Au. Note that a bonding method other than the above methods may be used.

The bonding allows the components included in the layer 563 to be electrically connected to the components included in the layer 561.

Figure 14:
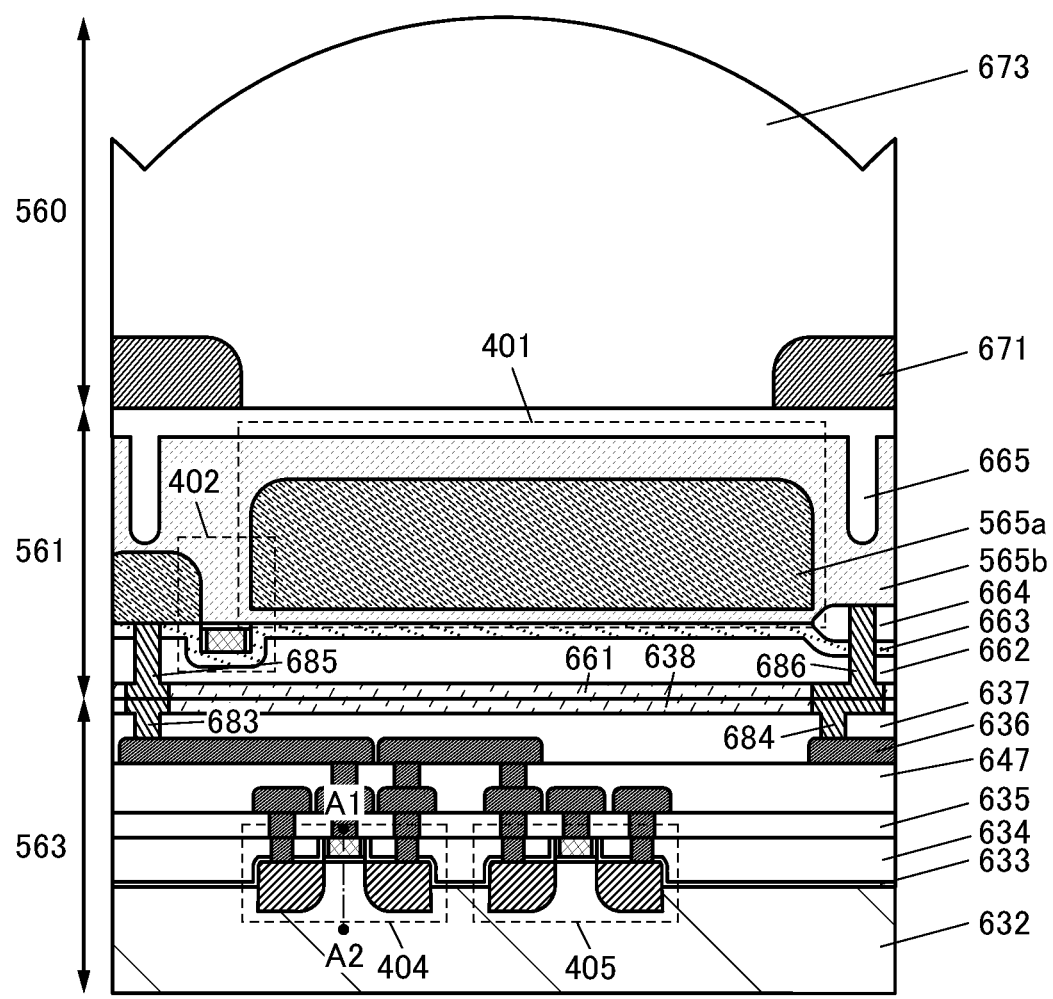
FIG. 14 is a cross-sectional view illustrating a structure example of an imaging device.

FIG. 14 is a modification example of the stack structure illustrated in FIG. 13. FIG. 14 differs from FIG. 13 in some of the structures of the layer 561 and the layer 563.

This modification example has a structure in which the transistor 402 included in the pixel 400 is provided in the layer 561. The transistor 402 that is covered with an insulating layer 663 is formed using a Si transistor in the layer 561. The one of the source and the drain of the transistor 402 is directly connected to the one electrode of the photoelectric conversion device 401. In addition, the other of the source and the drain of the transistor 402 is electrically connected to the node FD.

In an imaging device illustrated in FIG. 14, among transistors included in the imaging device, transistors excluding at least the transistor 402 are provided in the layer 563. Although FIG. 14 illustrates the transistor 404 and the transistor 405 as components provided in the layer 563, other components such as the transistor 403 and the transistor 406 can also be provided in the layer 563. Furthermore, in the layer 563 of the imaging device illustrated in FIG. 14, an insulating layer 647 is provided between the insulating layer 635 and the insulating layer 637. The insulating layer 647 has functions of an interlayer insulating film and a planarization film.

Embodiment 7

In this embodiment, a package where an imaging portion, what is called an image sensor chip, is put is described below.

FIG. 15A1 is an external perspective view of the top surface side of a package in which an image sensor chip is placed. The package includes a package substrate 410 to which an image sensor chip 452 (see FIG. 15A3) is fixed, a cover glass 420, an adhesive 430 for bonding them, and the like.

FIG. 15A2 is an external perspective view of the bottom surface side of the package. A BGA (Ball grid array) in which solder balls are used as bumps 440 on the bottom surface of the package is employed. Note that, without being limited to the BGA, an LGA (Land grid array), a PGA (Pin Grid Array), or the like may be included.

FIG. 15A3 is a perspective view of the package, in which parts of the cover glass 420 and the adhesive 430 are not illustrated. Electrode pads 460 are formed over the package substrate 410, and the electrode pads 460 and the bumps 440 are electrically connected via through-holes. The electrode pads 460 are electrically connected to the image sensor chip 452 through wires 470.

In addition, FIG. 15B1 is an external perspective view of the top surface side of a camera module in which an image sensor chip is placed in a package with a built-in lens. The camera module includes a package substrate 431 to which an image sensor chip 451 (FIG. 15B3 is fixed, a lens cover 432, a lens 435, and the like. Furthermore, an IC chip 490 (FIG. 15B3 having functions of a driver circuit, a signal conversion circuit, and the like of the imaging device is provided between the package substrate 431 and the image sensor chip 451; thus, a structure as an SiP (System in package) is included.

FIG. 15B2 is an external perspective view of the bottom surface side of the camera module. A QFN (Quad flat no-lead package) structure in which lands 441 for mounting are provided on the bottom surface and side surfaces of the package substrate 431 is included. Note that this structure is an example, and a QFP (Quad flat package) or the above BGA may be provided.

FIG. 15B3 is a perspective view of the module, in which parts of the lens cover 432 and the lens 435 are not illustrated. The lands 441 are electrically connected to electrode pads 461, and the electrode pads 461 are electrically connected to the image sensor chip 451 or the IC chip 490 through wires 471.

The image sensor chip placed in a package having the above form can be easily mounted on a printed board or the like, and the image sensor chip can be incorporated in a variety of semiconductor devices and electronic devices.

This embodiment can be combined with the description of the other embodiments as appropriate.

Embodiment 8

With the use of a driving assistance system using the embodiment described above, a driving assistance device that is suitable for a semi-autonomous driving vehicle is provided.

In Japan, the automation level of a driving assistance system for vehicles such as motor vehicles is defined in four levels, from Level 1 to Level 4. Level 1 allows automation of any of acceleration, steering, and braking and is called a driving safety support system. Level 2 allows automation of a plurality of operations among acceleration, steering, and braking at the same time and is called a semi-autonomous driving system (also referred to as semi-autonomous driving). Level 3 allows automation of all of acceleration, steering, and braking, where a driver handles driving only in case of emergency, and is also called a semi-autonomous driving system (also referred to as semi-autonomous driving). Level 4 allows automation of all of acceleration, steering, and braking and is called fully autonomous driving where a driver is rarely in charge of driving.

In this specification, a novel structure or a novel driving assistance system mainly premised on semi-autonomous driving in Level 2 or Level 3 is proposed.

In order to display warnings notifying a driver of the danger in accordance with circumstances obtained from a variety of cameras or sensors, the area of a display region adequate for the number of cameras or the number of sensors is necessary.

Figure 16A:
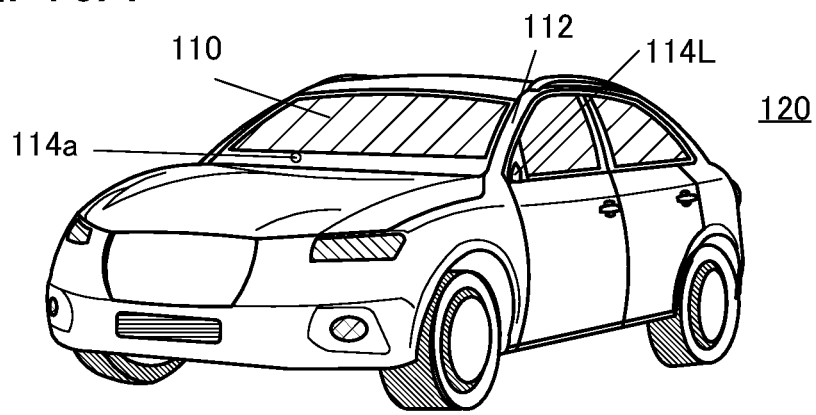
FIG. 16A is a diagram illustrating appearance of a vehicle.
Figure 16B:
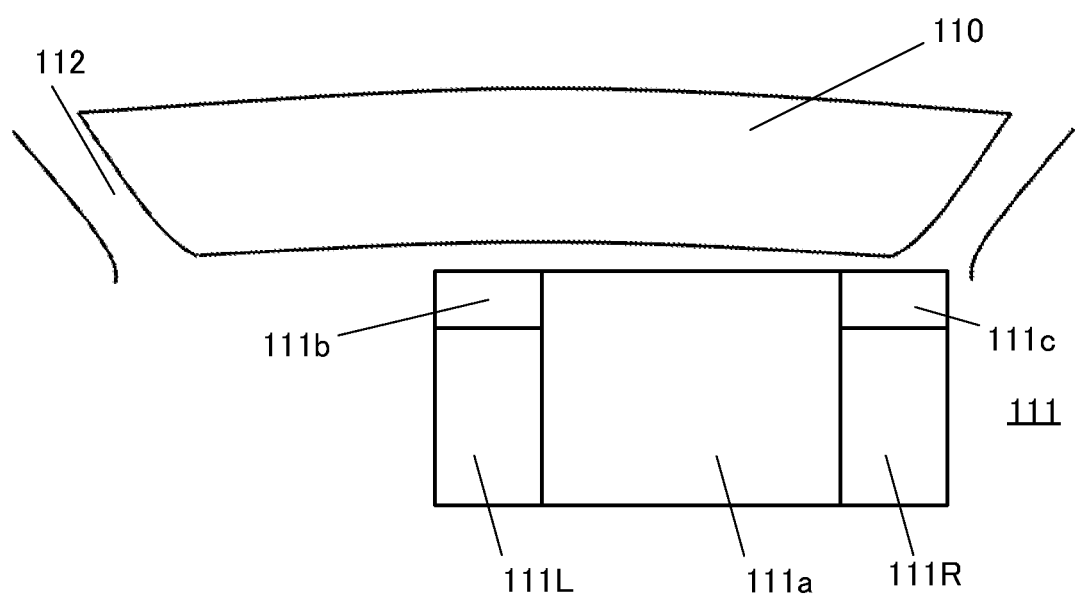
FIG. 16B is a schematic diagram showing the field of view of a driver positioned in the front of a vehicle seen from the inside of the vehicle.

In addition, FIG. 16A illustrates an exterior view of a vehicle 120. Note that FIG. 16A also illustrates examples of positions where a front image sensor 114a and a left-side image sensor 114L are provided. Furthermore, FIG. 16B is a schematic diagram illustrating the field of front view of a driver seen from the inside of a vehicle. A windshield 110 is positioned in an upper part of the field of view of the driver, and a display device 111 having a display screen is provided in a lower part of the field of view.

The windshield 110 is in the upper part of the field of view of the driver, and the windshield 110 is sandwiched between pillars 112. Although an example where the front image sensor 114a is provided in a position close to the field of view of the driver is illustrated in FIG. 16A, without particular limitation, the front image sensor 114a may be provided on a front grille or a front bumper. Furthermore, although an example of a right-hand-drive vehicle is illustrated in this embodiment, there is no particular limitation. In the case of a left-hand-drive vehicle, the front image sensor 114a may be provided in accordance with the position of the driver.

The image sensor chip described in Embodiment 7 is preferably used as at least one of these image sensors.

The driver mainly looks at the display device 111 to perform acceleration, steering, and braking and checks the outside of the vehicle from the windshield as an aid. As the display device 111, any one of a liquid crystal display device, an EL (Electro Luminescence) display device, and a micro LED (Light Emitting Diode) display device is used. Here, an LED chip whose one side size is larger than 1 mm is called a macro LED, an LED chip whose one side size is larger than 100 m and smaller than or equal to 1 mm is called a mini LED, and an LED chip whose one side size is smaller than or equal to 100 m is called a micro LED. It is particularly preferable to use a micro LED as an LED element applied to a pixel. The use of a micro LED can achieve an extremely high-resolution display device. The display device 111 preferably has higher resolution. The pixel density of the display device 111 can be a pixel density of higher than or equal to 100 ppi and lower than or equal to 5000 ppi, preferably higher than or equal to 200 ppi and lower than or equal to 2000 ppi.

For example, a center part 111a of the display screen of the display device displays an image obtained from an imaging device provided at the front outside the vehicle. In addition, parts 111b and 111c of the display screen perform meter display such as display of speed, estimated distance to empty, and abnormality warning. Furthermore, video of the left side outside the vehicle is displayed in a lower left part 111L of the display screen, and video of the right side outside the vehicle is displayed on a lower right part 111R of the display screen.

The lower left part 111L of the display screen and the lower right part 111R of the display screen can eliminate side view mirror protrusions that protrude greatly outside the vehicle by computerization of side view mirrors (also referred to as door mirrors).

The display screen of the display device 111 may be configured to be operated by touch input so that part of video is enlarged or reduced, a display position is changed, or the area of the display region is expanded, for example.

Because an image on the display screen of the display device 111 is a composite of data from a plurality of imaging devices or sensors, the image is created with an image signal processing device such as a GPU.

With the use of the driving assistance system described in Embodiment 1, an enlarged highlighted image can be output to the display device 111 by acquisition of monochrome image data with a wide dynamic range, extraction of only a distant region, and colorization performed by inference.

By using AI as appropriate, the driver can mainly look at a displayed image on the display device, that is, an image utilizing the image sensors and the AI in operating the vehicle and look at the front of the windshield as an aid. Operating the vehicle while looking at images utilizing the AI, rather than driving with only the driver's eyes, can be safe driving. Moreover, the driver can operate the vehicle with a sense of security.

Note that the display device 111 can be used around a driver's seat (also referred to as a cockpit portion) in various types of vehicles such as a large-sized vehicle, a middle-sized vehicle, and a small-sized vehicle. Furthermore, the display device 111 can also be used around the driver's seat in a vehicle such as an airplane or a ship.

In addition, although this embodiment describes an example where the front image sensor 114a is placed below the windshield, there is no particular limitation. An imaging camera illustrated in FIG. 17 may be placed on a hood or around an in-vehicle rearview mirror.

Figure 17:
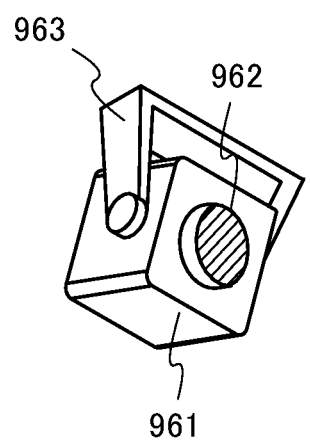
FIG. 17 is an example of an applied product for which an imaging system according to one embodiment of the present invention is employed.

The imaging camera in FIG. 17 can also be referred to as a dashboard camera, which includes a housing 961, a lens 962, a support portion 963, and the like. When a double-sided tape or the like is attached to the support portion 963, the imaging camera can be placed in the windshield, the hood, a rearview mirror support, or the like.

When the imaging camera in FIG. 17 is provided with the image sensor, driving video can be stored in the inside of the imaging camera or an in-vehicle storage device.

This embodiment can be freely combined with the other embodiments.

REFERENCE NUMERALS

10: data acquisition device, 11: solid-state imaging element, 12: analog arithmetic circuit, 13: A/D circuit, 14: memory portion, 15: display device, 16a: neural network portion, 16b: neural network portion, 16c: neural network portion, 17: data extraction portion, 18a: storage portion, 18b: storage portion, 18c: storage portion, 19: display portion, 21: display example, 22: distant region, 23: colorization image, 24: highlighted image, 31: driving assistance system, 41: imaging system, 110: windshield, 111: display device, 11a: central part, 111b:

part, 111c: part, 111L: lower left part, 111R: lower right part, 112: pillar, 114a: front image sensor, 114L: left-side image sensor, 120: vehicle, 200: pixel block, 201: circuit, 202: capacitor, 203: transistor, 204: transistor, 205: transistor, 206: transistor, 207: resistor, 211: wiring, 212: wiring, 213: wiring, 215: wiring, 216: wiring, 217: wiring, 218: wiring, 219: wiring, 300: pixel array, 301: circuit, 302: circuit, 303: circuit, 304: circuit, 305: circuit, 306: circuit, 311: wiring, 400: pixel, 401: photoelectric conversion device, 402: transistor, 403: transistor, 404: transistor, 405: transistor, 406: transistor, 407: capacitor, 410: package substrate, 411: wiring, 412: wiring, 413: wiring, 413a: wiring, 413b: wiring, 413c: wiring, 413d: wiring, 413e: wiring, 413f: wiring, 413g: wiring, 413h: wiring, 413i: wiring, 413j: wiring, 414: wiring, 415: wiring, 417: wiring, 420: cover glass, 421: wiring, 422: wiring, 423: wiring, 424: wiring, 430: adhesive, 431: package substrate, 432: lens cover, 435: lens, 440: bump, 441: land, 450: transistor, 450a: transistor, 450b: transistor, 450c: transistor, 450d: transistor, 450e: transistor, 450f: transistor, 450g: transistor, 450h: transistor, 450i: transistor, 450j: transistor, 451: image sensor chip, 452: image sensor chip, 460: electrode pad, 461: electrode pad, 470: wire, 471: wire, 490: IC chip, 545: semiconductor layer, 546: insulating layer, 560: layer, 561: layer, 563: layer, 565a: layer, 565b: layer, 566a: layer, 566b: layer, 566c: layer, 566d: layer, 567a: layer, 567b: layer, 567c: layer, 567d: layer, 567e: layer, 632: silicon substrate, 633: insulating layer, 634: insulating layer, 635: insulating layer, 636: conductive layer, 637: insulating layer, 638: insulating layer, 647: insulating layer, 651: insulating layer, 652: insulating layer, 653: insulating layer, 654: insulating layer, 655: conductive layer, 661: insulating layer, 662: insulating layer, 664: insulating layer, 665: insulating layer, 671: light-blocking layer, 673: micro lens array, 683: conductive layer, 684: conductive layer, 685: conductive layer, 686: conductive layer, 961: housing, 962: lens, and 963: support portion.

The invention claimed is:

1. A driving assistance method comprising the steps of:
    driving a vehicle incorporating an imaging device;
    capturing a monochrome image of a front of the vehicle during driving by the imaging device;
    performing inference of regions of at least a sky, a car, and a road by performing segmentation processing on the monochrome image;
    performing inference of a distant region to be extracted from the monochrome image by performing depth estimation processing on the monochrome image;
    determining a center of the distant region to be extracted on the basis of the segmentation processing and the depth estimation processing;
    measuring driving speed of the vehicle and determining size of the distant region to be extracted according to the driving speed of the vehicle;
    extracting the distant region with a determined size from the monochrome image;
    performing super-resolution processing to an extracted distant region;
    after performing the super-resolution processing, performing colorization processing for highlighting of an object included in the extracted distant region; and
    performing enlargement of the extracted distant region after the colorization processing.

2. The driving assistance method according to claim 1,
    wherein the segmentation processing uses first neural network processing,
    wherein the depth estimation processing uses second neural network processing,
    wherein the super-resolution processing uses third neural network processing, and
    wherein the colorization processing uses fourth neural network processing.

3. The driving assistance method according to claim 1, wherein the imaging device does not include a color filter.

4. The driving assistance method according to claim 1,
    wherein when the vehicle moves at a first driving speed, the size of the distant region is larger than when the vehicle moves at a second driving speed, and
    wherein the first driving speed is faster than the second driving speed.

5. The driving assistance method according to claim 1, wherein the distant region includes at least a road edge portion.

6. A computer program product comprising a non-transitory computer readable medium encoded with an information processing program for use in an information processing device, the program when executed performs the operations comprising:
    driving a vehicle incorporating an imaging device;
    capturing a monochrome image of a front of the vehicle during driving by the imaging device;
    performing inference of regions of at least a sky, a car, and a road by performing segmentation processing on the monochrome image;
    performing inference of a distant region to be extracted from the monochrome image by performing depth estimation processing on the monochrome image;
    determining a center of the distant region to be extracted on the basis of the segmentation processing and the depth estimation processing;
    measuring driving speed of the vehicle and determining size of the distant region to be extracted according to the driving speed of the vehicle;
    extracting the distant region with a determined size from the monochrome image;
    performing super-resolution processing on an extracted distant region;
    after performing the super-resolution processing, performing colorization processing for highlighting of an object included in the extracted distant region; and
    performing enlargement of the extracted distant region after the colorization processing.

* * * * *